United States Patent
Nakai et al.

(10) Patent No.: US 9,479,106 B2
(45) Date of Patent: Oct. 25, 2016

(54) APPARATUS FOR CONTROLLING ROTARY MACHINE

(71) Applicant: DENSO CORPORATION, Kariya, Aichi-pref. (JP)

(72) Inventors: Yasuhiro Nakai, Kariya (JP); Hajime Uematsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/808,742

(22) Filed: Jul. 24, 2015

(65) Prior Publication Data

US 2016/0028339 A1 Jan. 28, 2016

(30) Foreign Application Priority Data

Jul. 25, 2014 (JP) .................................. 2014-152338

(51) Int. Cl.
*G05B 11/01* (2006.01)
*H02P 29/00* (2016.01)

(52) U.S. Cl.
CPC ........... *H02P 29/0038* (2013.01); *H02P 21/22* (2016.02)

(58) Field of Classification Search
CPC .. B60L 15/025; H02P 23/0081; H02P 27/04; G05D 3/1418; G05B 5/01
USPC ........................................ 318/529, 632, 727
See application file for complete search history.

(56) References Cited

U.S. PATENT DOCUMENTS

| 5,047,909 A * | 9/1991 | Hosoda ................... H02P 27/06 318/806 |
| 5,235,503 A * | 8/1993 | Stemmler ........... H02M 5/4505 307/102 |
| 2002/0097015 A1 | 7/2002 | Kitajima et al. |
| 2004/0195993 A1* | 10/2004 | Yoshimoto .............. H02P 21/06 318/802 |
| 2004/0225468 A1* | 11/2004 | McGaughey ........... H02P 21/18 702/145 |
| 2009/0237022 A1 | 9/2009 | Yamamoto et al. |
| 2013/0193898 A1* | 8/2013 | Williams ................. G05B 5/01 318/504 |
| 2015/0333681 A1 | 11/2015 | Matsuki et al. |

FOREIGN PATENT DOCUMENTS

| JP | 2002-010686 A | 1/2002 |
| JP | 3852289 B2 | 11/2006 |
| JP | 2009-232530 A | 10/2009 |
| JP | 2015-220884 A | 12/2015 |

* cited by examiner

*Primary Examiner* — Rina Duda
(74) *Attorney, Agent, or Firm* — Oliff PLC

(57) ABSTRACT

In a control apparatus, a target harmonic current obtainer obtains, according to a phase current flowing through at least one phase winding of a stator, a target harmonic current component flowing in a rotary machine. The target harmonic current component is included in a fundamental current component of the phase current. An inducing unit superimposes, on the phase information, a fluctuating signal that changes at an angular velocity identical to an angular velocity of the target harmonic current component, to induce a counteracting harmonic current component in the at least one phase winding. The counteracting harmonic current component counteracts the target harmonic current component.

9 Claims, 6 Drawing Sheets

APPARATUS FOR CONTROLLING ROTARY MACHINE

CROSS REFERENCE TO RELATED APPLICATIONS

This application is based on and claims the benefit of priority from Japanese Patent Application 2014-152338 filed on Jul. 25, 2014, the disclosure of which is incorporated in its entirety herein by reference.

TECHNICAL FIELD

The present disclosure relates to apparatuses for controlling a rotary machine electrically connected to a power converter having a switching element.

BACKGROUND

There are various methods for controlling on-off switching operations of switching elements to control harmonic current components, one of which is disclosed in Japanese Patent Publication No. 3852289. The disclosed method compares a command current value determined from a value of required torque and such harmonic current components with a carrier signal having an amplitude predetermined based on the amplitude of the sinusoidal command voltage. Then, the disclosed method performs pulse-width modulation (PWM) control based on the results of the comparison. The PWM control cyclically generates a drive pulse signal for driving each switching element while adjusting a duty cycle of the drive pulse signal based on the results of the comparison for each switching cycle.

SUMMARY

Another method is known to control on-off switching operations of the switching elements of the inverter. This method uses on-off switching patterns, i.e. on-off pulse patterns, for each of the switching elements. Specifically, a control apparatus includes a storage in which a plurality of on-off switching patterns each predetermined for a corresponding value of the amplitude of an output voltage vector of the inverter; each of the on-off switching patterns is associated with a corresponding value of an electrical rotational angle of the motor.

Specifically, the control apparatus determines a phase of the output voltage vector of the inverter in a first-order rotating coordinate system, which is defined as a coordinate system that rotates at an angular velocity that is identical to a fluctuating angular velocity of a fundamental component of a current flowing in the motor in a three-phase fixed coordinate system. The phase of the output voltage vector serves as a manipulated variable for feedback controlling a controlled variable, such as torque, of the motor to a target value. The control apparatus selects, for each of the switching elements, one of the on-off switching patterns matching with a value of the amplitude of the output voltage vector. Then, the control apparatus shifts the selected on-off switching pattern for each of the switching elements by the determined phase of the output voltage vector relative to a present value of the electrical rotational angle of the motor. The control apparatus alternately switches on and off each of the switching elements according to a corresponding one of the shifted on-off switching patterns.

Unfortunately, there are no specific methods for cancelling harmonic current components included in a phase current using such on-off switching patterns. Users for motors therefore desire one or more specific methods for cancelling harmonic current components included in a phase current using such on-off switching patterns.

In view of the circumstances set forth above, one aspect of the present disclosure seeks to provide apparatuses for controlling a rotary machine, which are capable of addressing such desires of users for motors.

Specifically, an alternative aspect of the present disclosure aims to provide such apparatuses, each of which is capable of reducing a harmonic current component flowing in a rotary machine using on-off switching patterns for a switching element of a power converter.

According to an exemplary aspect of the present disclosure, there is provided an apparatus for feedback controlling a controlled variable of a rotary machine to thereby rotate a rotor relative to a stator using power obtained by a power converter. The apparatus includes a phase setter configured to set a phase of an output voltage vector of the power converter in a rotating coordinate system. The phase of the output voltage vector serves as a manipulated variable for feedback controlling the controlled variable of the rotary machine to a target value. The phase setter is configured to output phase information including the phase of the output voltage and an electrical rotational angle of the rotor. The rotating coordinate system rotates as the rotor of the rotary machine rotates. The apparatus includes a storage configured to store therein on-off switching patterns of a switching element of the power converter. The on-off switching patterns are provided for respective predetermined values of an amplitude parameter depending on an amplitude of the output voltage vector. The apparatus includes a switching unit configured to (1) Select one of the on-off switching patterns corresponding to a specified value of the amplitude parameter (2) Extract an on or off instruction from the selected one of the on-off switching patterns according to a change of the phase information output from the phase setter (3) Switch on or off the switching element according to the extracted on or off instruction.

The apparatus includes a target harmonic current obtainer configured to obtain, according to a phase current flowing through at least one phase winding of the stator, a target harmonic current component flowing in the rotary machine. The target harmonic current component is included in a fundamental current component of the phase current. The apparatus includes an inducing unit configured to superimpose, on the phase information, a fluctuating signal that changes at an angular velocity identical to an angular velocity of the target harmonic current component, to induce a counteracting harmonic current component in the at least one phase winding. The counteracting harmonic current component counteracts the target harmonic current component.

This configuration superimposes, on the phase information used by the switching unit, a fluctuating signal that changes at an angular velocity identical to an angular velocity of the target harmonic current component. This induces the counteracting harmonic current component in the at least one phase winding. The counteracting harmonic current component induced in the at least one phase winding counteracts the target harmonic current component, thus reducing the target harmonic current component. This reduces torque variations and/or iron loss of the rotary machine due to the target harmonic current component.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
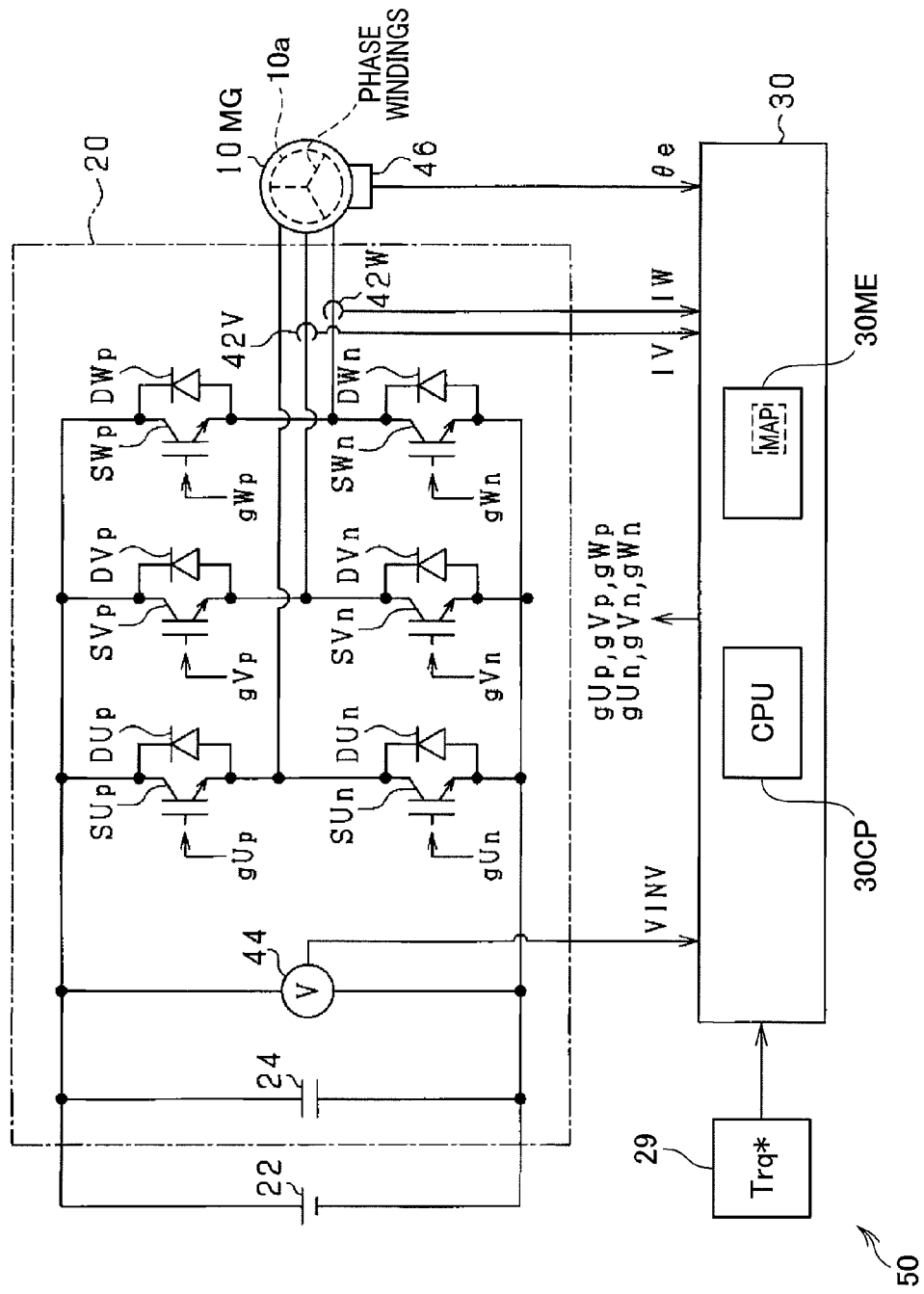
FIG. 1 is a circuit diagram of a control apparatus for controlling a motor-generator according to the first embodiment of the present disclosure.

The following describes embodiments of the present disclosure with reference to the accompanying drawings. In the embodiments, like parts between the embodiments, to which like reference characters are assigned, are omitted or simplified to avoid redundant description.

First Embodiment

Referring to FIG. 1, the first embodiment of the present disclosure illustrates in FIG. 1 a three-phase motor-generator, referred to simply as "motor-generator" 10 installed in a target vehicle as an example of rotary machines. Each of the embodiments uses a motor having a salient-pole structure as the motor-generator 10. For example, each of the embodiments uses an interior permanent magnet synchronous motor (IPMSM) as the motor-generator 10.

FIG. 1 also illustrates a control system 50. The control system 50 is equipped with an inverter 20 serving as a power converter, a high-voltage battery 22 serving as a DC power supply, a smoothing capacitor 24, a control system 26, and a control apparatus 30.

The motor-generator 10 and the high-voltage battery 12 can establish electrical connection therebetween via the inverter 20.

For example, the motor-generator 10 is provided with an annular rotor 10a having an iron rotor core and rotatably disposed in the motor-generator 10. The iron rotor core is, for example, directly or indirectly coupled to a crankshaft of an engine installed in the target vehicle to be rotatable together with the crankshaft.

The rotor 10a has a salient-pole structure.

The rotor core of the rotor 10a is specifically provided at its circumferential portions with at least one pair of permanent magnets. The permanent magnets of the at least one pair are so embedded in the outer periphery of the rotor core as to be symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor 10a has a direct axis (d-axis) in line with a direction of magnetic flux created by the N pole, in other words, in line with an N-pole center line. The rotor 10a also has a quadrature axis (q-axis) with a phase being $\pi/2$-radian electrical angle leading with respect to a corresponding d-axis during rotation of the rotor 10a. In other words, the q-axis is electromagnetically perpendicular to the d-axis.

The d and q axes constitute a d-q coordinate system, i.e. a first-order rotating coordinate system, defined relative to the rotor 10a of the motor-generator 10. The first-order rotating coordinate system is defined as a coordinate system that rotates at an angular velocity identical to an angular velocity of a fundamental component of a phase current flowing in the motor-generator 10 in the three-phase fixed coordinate system.

An inductance $L_d$ in the d-axis is lower than an inductance $L_q$ in the q-axis because the permanent magnets have a magnetic permeability constant lower than that of the iron. Motors having a salient-pole structure means motors each having this inductance characteristic of the rotor 10a.

The motor-generator 10 is also provided with a stator. The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

For example, the stator core also has a plurality of slots. The slots are formed through the stator core and are circumferentially arranged at given intervals. The stator also includes a set of three-phase windings, i.e. armature windings, wound in the slots of the stator.

The three-phase windings, i.e. U-, V-, and W-phase windings, are wound in the slots such that the U-, V-, and W-phase windings are shifted, i.e. offset, by an electrical angle of, for example, $2\pi/3$ radian in phase from each other.

For example, the three-phase armature windings, i.e. U-, V-, and W-phase windings, each have one end connected to a common junction, i.e. a neutral point, and the other end to a separate terminal in, for example, a star-configuration.

The motor-generator 10 is operative to receive, at each of the three-phase windings, one of the three phase currents to thereby generate a rotating magnetic flux; this allows the rotor 10a to turn based on magnetic attractive force between the rotating magnetic flux and a magnetic flux of the rotor 10a.

The high-voltage battery 22 is capable of outputting a voltage equal to or higher than 100 V. The smoothing capacitor 24 is disposed between the high-voltage battery 22 and the inverter 20. The smoothing capacitor 24 is operative to smooth the output voltage from the high-voltage battery 22, and supply the smoothed output voltage to the inverter 20 as input voltage.

The inverter 20 is designed as a three-phase inverter. The inverter 20 is provided with a first pair of series-connected upper- and lower-arm (high- and low-side) U-phase switching elements SUp and SUn, a second pair of series-connected upper- and lower-arm V-phase switching elements SVp and SVn, and a third pair of series-connected upper- and lower-arm W-phase switching elements SWp and SWn. The inverter 20 is also provided with flywheel diodes DUp, DUn, DVp, DVn, DWp, and DWn electrically connected in antiparallel to the respective switching elements SUp, SUn, SVp, SVn, SWp, and SWn.

In the first embodiment, as the switching elements S&# (&=U, V, and W, and #=p and n), IGBTs are respectively used.

When power MOSFETs are used as the switching elements S&#, intrinsic diodes of the power MOSFETs can be used as the flywheel diodes, thus eliminating the need for external flywheel diodes.

The first to third pairs of switching elements are parallely connected to each other in bridge configuration.

A connection point through which the switching elements SUp and SUn of the first pair are connected to each other in series is connected to an output lead extending from the separate terminal of the U-phase winding. Similarly, a connection point through which the switching elements SVp and SVn of the second pair are connected to each other in series is connected to an output lead extending from the separate end of the V-phase winding. Moreover, a connection point through which the switching elements SWp and SWn of the third pair are connected to each other in series is connected to an output lead extending from the separate end of the W-phase winding.

One end of the series-connected switching elements of each of the first, second, and third pairs is connected to the positive terminal of the high-voltage battery 22 via a positive terminal of the inverter 20. The other end of the series-connected switching elements of each of the first, second, and third pairs is connected to the negative terminal of the high-voltage battery 22 via a negative terminal of the inverter 20.

The control system 50 also includes current sensors 42V and 42W serving as, for example, phase-current measuring means, a voltage sensor 44 serving as, for example, voltage measuring means, and a rotational angle sensor 46 serving as, for example, a rotational angle measuring means.

The current sensor 42V is arranged to allow measurement of an instantaneous V-phase alternating current IV actually flowing through the V-phase winding of the stator. Similarly, the current sensor 42W is arranged to allow measurement of an instantaneous W-phase alternating current IW actually flowing through the W-phase winding of the stator.

The current sensors 42V and 42W are communicable with the control apparatus 30.

Each of the current sensors 42V and 42W is operative to send, to the control apparatus 30, the instantaneous value of a corresponding one of the V-, and W-phase alternating currents.

The voltage sensor 44 is arranged to allow measurement of the input voltage, referred to as an input voltage VINV, to be supplied to the inverter 20 from the high-voltage power source 22 via the smoothing capacitor 24. The voltage sensor 42 is communicable with the control apparatus 30, and operative to send, to the control apparatus 30, the input voltage VINV.

The rotational angle sensor 46 includes, for example, a resolver. The rotational angle sensor 46 is for example configured to measure, i.e. monitor, a rotational angle, i.e. an electrical rotational angle, θe of the rotor 10a of the motor-generator 10 every control cycle of the control apparatus 30 described later; the rotational angle θe of the rotor 10a of the motor-generator 10 represents a rotational angle of the d-axis of the rotor 10a. The rotational angle sensor 46 is communicable with the control apparatus 30, and operative to send, to the control apparatus 30, the monitored rotation angle θe of the rotor 10a every control cycle.

The control apparatus 30 is designed as, for example, a computer circuit including essentially, for example, a CPU 30CP and a memory 30ME serving as, for example, a storage according to the present disclosure.

The control apparatus 30 is connected to the control system 26 for inputting, to the control apparatus 30, target torque, i.e. request torque, Trq* for the motor-generator 10. For example, a control apparatus, which is higher in hierarchy than the control apparatus 30, can be used as the control system 26 if the control apparatuses are arranged in a hierarchical relationship.

The control apparatus 30 is designed to receive the measured values output from the sensors 42V, 42W, 44, and 46, and the target torque Trq* as received pieces of data. Then, the control apparatus 30 is designed to generate, based on the received pieces of data set forth above, drive signals, i.e. pulse-width modulated (PWM) signals, g&# for individually driving the respective switching elements S&# of the inverter 20.

The control apparatus 30 is designed to supply the drive signals g&# to the control terminals of the respective switching elements S&# of the inverter 20.

This individually turns on or off the respective switching elements S&#, thus converting the input voltage VINV into a controlled AC voltage, so that the controlled AC voltage is supplied to the motor-generator 10. The drive signals g&# aim to switch the respective switching elements S&# to feedback control at least one controlled variable, such as torque, generated by the motor-generator 10 so that the at least one controlled variable matches the target torque Trq*.

For example, the control apparatus outputs the drive signals g&# that complementarily turns on the upper- and lower-arm switching elements S&p and S&n of each pair while dead times during which the upper- and lower-arm switching elements S&p and S&n are simultaneously turned off are ensured. Introducing the dead time prevents the upper and lower-arm switching elements S&p and S&n from being simultaneously on.

Each of the drive signals g&# has a predetermined duty factor, i.e. a controllable on-pulse width for each switching cycle, in other words, a predetermined ratio, i.e. percentage, of on duration to the total duration of each switching cycle for a corresponding one of the switching elements S&#.

Figure 2:
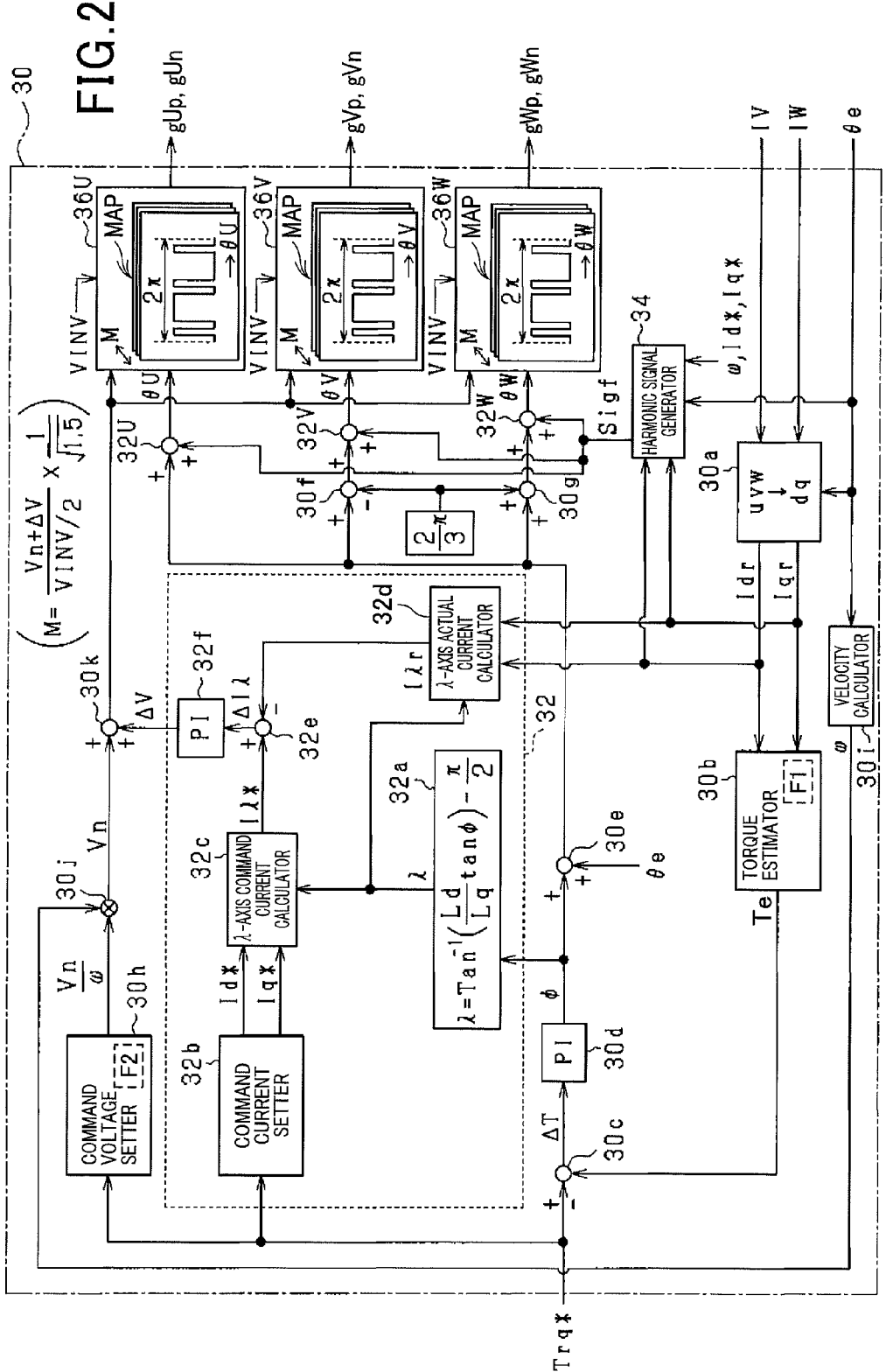
FIG. 2 is a block diagram schematically illustrating an example of the specific structure of a control apparatus illustrated in FIG. 1.

Next, the following describes an example of the specific structure of the control apparatus 30 for performing torque control, i.e. torque feedback control, including amplitude control and phase control, to generate the drive signals g&# for the respective switching elements S&p and S&n every predetermined control period with reference to FIG. 2.

As illustrated in FIG. 2, the control apparatus 30 includes a two-phase converter 30a, a torque estimator 30b, a torque deviation calculator 30c, a phase setter 30d, an electrical angle adder 30e, a first shifter 30f and a second shifter 30g. The control apparatus also includes a command voltage setter 30h, a velocity calculator 30i, a velocity multiplier 30j, a corrector 30k, a correction calculator 32, a U-phase superimposer 32U, a V-phase superimposer 32V, a W-phase superimposer 32W, a harmonic signal generator 34, and U-, V-, and W-phase drive signal generators 36U, 36V, and 36W.

For example, the modules 30a to 30k, 32, 32U, 32V, 32W, 34, and 36U to 36W cooperatively operate to carry out the torque control including the phase control and the amplitude control described in detail hereinafter. The modules 30a to 30k, 32, 32U, 32V, 32W, 34, and 36U to 36W can be implemented as hardware modules, software modules, and/or hardware-software hybrid modules.

First, the following describes operations of some of the modules 30a to 30k, 32, 32U, 32V, 32W, 34, and 36U to 36W for performing mainly the phase control.

The two-phase converter 30a, which serves as, for example, a two-phase converter, receives instantaneous V- and W-phase currents Iv and Iw measured by the respective current sensors 42V and 42W and the rotational angle θe of the d-axis of the rotor 10a measured by the rotational angle sensor 46.

The two-phase converter 30a calculates an instantaneous U-phase current IU based on the instantaneous V- and W-phase currents IV and IW in accordance with Kirchhoff's law. Then, the two-phase converter 30a converts the instantaneous U-, V-, and W-phase currents IU, IV, and IW in a three-phase fixed-coordinate system into d- and q-axis currents Idr and Iqr in the first-order rotating coordinate system, i.e. the d-q coordinate system, based on the electrical rotational angle θe of the rotor 10a. The stator coordinate system is fixedly defined relative to the stator; the stator coordinate system has fixed three axes corresponding to the three-phase windings of the stator. The two-phase converter 30a performs the conversion using correlations between the first-order rotating coordinate system and the stator coordinate system as a function of the electrical rotational angle θe.

The torque estimator 30b is operatively connected to the two-phase converter 30a. The torque estimator 30b is operative to calculate estimated torque Te for torque actually created by the motor-generator 10 based on the d-axis and q-axis currents Idr and Iqr input from the two-phase converter 30a.

For example, the torque estimator 30b calculates the estimated torque Te using, for example, information F1 in data-table (map) format, in mathematical expression format, and/or program format. The information F1, which is for example stored in the memory 30ME includes a function, i.e. correlation, of values of the estimated torque Te with respect to the pair of values of the d-axis current Idr, and values of the q-axis current Iqr. The torque estimator 30b can retrieve a value of the estimated torque Te corresponding to values of the d-axis and q-axis currents Idr and Iqr in the information F1.

When the information F1 includes one or more model equations, the one or more model equations are defined based on variables of the d-axis and q-axis currents Idr and Iqr. The torque estimator 30b can assign values of the d-axis and q-axis currents Idr and Iqr to the one or more model equations, thus calculating estimated torque Te.

The torque deviation calculator 30c is operatively connected to the torque estimator 30b, and subtracts the estimated torque Te from the target torque Trq* to thereby calculate a torque deviation ΔT between the estimated torque Te and the target torque Trq*. Note that the control apparatus 30 can include a filter, such as a low-pass filter, which eliminates high-frequency components, which are higher than a predetermined threshold frequency, from the estimated torque Te calculated by the torque estimator 30b. This modification can cause the torque deviation calculator 30c to subtract the corrected estimated torque Te from the target torque Trq* to thereby calculate the torque deviation ΔT between the corrected estimated torque Te and the target torque Trq*.

The phase setter 30d, which serves as, for example, a voltage phase setter, is operatively connected to the torque deviation calculator 30c. The phase setter 30d sets, i.e. calculates, based on the torque deviation ΔT, a phase φ of an output voltage vector Vnvt of the inverter 20 in the first-order rotating coordinate system. That is, the phase φ of the output voltage vector Vnvt serves as a manipulated variable for feedback controlling the estimated torque Te to match with the target torque Trq*. The voltage vector Vnvt has a d-axis voltage component Vd and a q-axis voltage component Vq in the first-order rotating coordinate system.

Specifically, the phase setter 30d according to the first embodiment calculates the phase φ of the output voltage vector Vnvt in accordance with a predetermined proportional gain and a predetermined integral gain, i.e. feedback gains, of a proportional-integral (PI) feedback control algorithm (PI algorithm) using the torque deviation ΔT as its input.

In the PI algorithm, the phase φ of the output voltage vector Vnvt is expressed based on the sum of an output, i.e. a proportional gain term, of a proportional unit based on the proportional gain and an output, i.e. an integral gain term, of an integrator based on the integral gain.

The proportional gain for the phase φ of the output voltage vector Vnvt contributes to change in the phase φ of the output voltage vector Vnvt in proportion to the temporal torque deviation ΔT from a target value of zero.

The integral gain is proportional to an accumulated offset of instantaneous values of the torque deviation ΔT over time to reset the accumulated offset (steady-state deviation) over time to zero.

The phase φ of the output voltage vector Vnvt, which will be referred to as a voltage phase φ, is defined such that a counter clockwise rotational direction from the positive side of the d-axis toward the positive side of the q-axis represents the positive direction of the voltage phase φ. The phase setter 30d advances, in accordance with the definition of the voltage phase φ, the voltage phase φ when the estimated torque Te is lower than the target torque Trq*. The phase setter 30d also delays, in accordance with the definition of the voltage phase φ, the voltage phase φ when the estimated torque Te is higher than the target torque Trq*.

The electrical angle adder 30e is operatively connected to the phase setter 30d, and adds the electrical rotational angle θe to the voltage phase φ calculated by the phase setter 30d. Then, the electrical angle adder 30e outputs an angle (θe+φ) as a result of the addition.

The first shifter 30f is operatively connected to the electrical angle adder 30e, and subtracts an electrical angle of 2π/3 from the output angle (θe+φ) of the electrical angle adder 30e, thus shifting, i.e. advancing, the output angle (θe+φ) by the electrical angle of 2π/3.

The second shifter 30g is operatively connected to the electrical angle adder 30e, and adds an electrical angle of 2π/3 to the output angle (θe+φ) of the electrical angle adder 30e, thus shifting, i.e. retarding, the output angle (θe+φ) by the electrical angle of 2π/3.

This combination of the modules 30e, 30f, and 30g serves to generate a first phase (θe+φ) output from the module 30e, a second phase (θe+φ−2π/3) output from the module 30f, and a third phase (θe+φ+2π/3) output from the module 30g; these phases (θe+φ), (θe+φ−2π/3), and (θe+φ+2π/3) have been offset by an electrical angle of 2π/3 from each other.

The U-phase superimposer 32U is operatively connected to the electrical angle adder 30e and the harmonic signal generator 34. The U-phase superimposer 32U superimposes a fluctuating signal Sigf output from the harmonic signal generator 34 on the first phase (θe+φ) output from the electrical angle adder 30e, thus outputting a U-phase reference angular signal θU with the first phase (θe+φ).

The V-phase superimposer 32V is operatively connected to the first shifter 30f and the harmonic signal generator 34. The V-phase superimposer 32V superimposes the fluctuating signal Sigf output from the harmonic signal generator 34 on the second phase (θe+φ−2π/3) output from the first shifter 30f, thus outputting a V-phase reference angular signal θV with the second phase (θe+φ−2π/3).

The W-phase superimposer 32W is operatively connected to the second shifter 30g and the harmonic signal generator 34. The W-phase superimposer 32W superimposes the fluctuating signal Sigf output from the harmonic signal generator 34 on the third phase (θe+φ+2π/3) output from the second shifter 30g, thus outputting a W-phase reference angular signal θW with the third phase (θe+φ+2π/3).

Note that each of the U-, V-, and W-phase superimposers 32U, 32V, and 32W serve as, for example, a superimposer in combination or alone. Detailed operations of the harmonic signal generator 34 will be described later.

Next, the following describes operations of some of the modules 30a to 30k, 32, 32U, 32V, 32W, 34, and 36U to 36W for performing mainly the amplitude control.

The command-voltage setter 30h, which serves as a command amplitude setter, has, for example, information F2 in data-table (map) format, in mathematical expression format, and/or program format. The information F2, which is for example stored in the memory 30ME, includes a function, i.e. a correlation, of values of a normalized amplitude Vn/ω of the output voltage vector Vnvt in the first-order rotating coordinate system with respect to values of the target torque Trq*. The amplitude Vn of the output voltage vector Vnvt of the inverter 20 is defined as the square root of the sum of the square of the d-axis voltage component Vd and the square of the q-axis voltage component Vq of the output voltage vector Vnvt. The normalized amplitude Vn/ω of the output voltage vector Vnvt represents division of the command value of the amplitude Vn of the output voltage vector Vnvt from the inverter 20 by the electrical angular velocity co of the rotor 10a.

The velocity calculator 30i is operatively connected to the command-voltage setter 30h, and calculates the electrical angular velocity ω of the rotor 10a based on the electrical rotational angle θe of the rotor 10a measured by the rotational angle sensor 46.

The velocity multiplier 30j is operatively connected to the command-voltage setter 30h and to the velocity calculator 30i, and multiplies the normalized command-voltage amplitude Vn/ω by the electrical angular velocity ω. This multiplication calculates a value of the amplitude Vn of the output voltage vector Vnvt. The value of the amplitude Vn of the output voltage vector Vnvt serves as a manipulated variable for feedforward controlling the torque of the motor-generator 10 to match with the target torque Trq*.

The corrector 30k is operatively connected to the velocity multiplier 30j, and adds, to the value of the amplitude Vn of the output voltage vector Vnvt output from the velocity multiplier 30j, an amplitude correction ΔV calculated by the correction calculator 32. This addition calculates the sum of the value of the amplitude Vn of the output voltage vector Vnvt and the amplitude correction ΔV, as a correction value of the value of the amplitude Vn of the output voltage vector Vnvt. The sum of the value of the amplitude Vn of the output voltage vector Vnvt and the amplitude correction ΔV will be referred to as a corrected voltage amplitude (Vn+ΔV) hereinafter. Detailed operations of the correction calculator 32 will be described later.

The U-phase drive signal generator 36U is operatively connected to the U-phase superimposer 32U and the corrector 30k. The U-phase drive signal generator 36U generates U-phase drive signals gUp and gUn according to the corrected voltage amplitude (Vn+ΔV) output from the corrector 30k, the U-phase reference angular signal θU, and the input voltage VINV. Then, the U-phase drive signal generator 36U outputs the U-phase drive signals gUp and gUn to the control terminals of the respective U-phase switching elements SUp and SUn of the inverter 20, thus controlling on-off operations of the respective switches SUp and SUn.

The V-phase drive signal generator 36V is operatively connected to the V-phase superimposer 32V and the corrector 30k. The V-phase drive signal generator 36V generates V-phase drive signals gVp and gVn according to the corrected voltage amplitude (Vn+ΔV) output from the corrector 30k, the V-phase reference angular signal θV, and the input voltage VINV. Then, the V-phase drive signal generator 36V outputs the V-phase drive signals gVp and gVn to the control terminals of the respective V-phase switching elements SVp and SVn of the inverter 20, thus controlling on-off operations of the respective switches SVp and SVn.

The W-phase drive signal generator 36W is operatively connected to the W-phase superimposer 32W and the corrector 30k. The W-phase drive signal generator 36W generates W-phase drive signals gWp and gWn according to the corrected voltage amplitude (Vn+ΔV) output from the corrector 30k, the W-phase reference angular signal θW, and the input voltage VINV. Then, the W-phase drive signal generator 36W outputs the W-phase drive signals gWp and gWn to the control terminals of the respective W-phase switching elements SWp and SWn of the inverter 20, thus controlling on-off operations of the respective switches SWp and SWn.

The following describes detailed operations of each of the U-, V-, and W-phase drive signal generators 36U, 36V, and 36W, which serves as, for example, a switching unit, for generating these switching signals gUp, gUn, gVp, gVn, gWp, and gWn.

At least one of the U-, V-, and W-phase drive signal generators 36U, 36V, and 36W calculates a modulation factor M based on normalization of the input voltage VINV using the corrected voltage amplitude (Vn+ΔV). Specifically, at least one of the U-, V-, and W-phase drive signal generators 36U, 36V, and 36W divides the corrected voltage amplitude (Vn+V) by half of the input voltage VINV to obtain a quotient, and divides the quotient by $\sqrt{1.5}$, i.e.

$$\sqrt{\frac{3}{2}},$$

thus calculating the modulation factor M.

Each of the U-, V-, and W-phase drive signal generators 36U, 36V, and 36W uses, for example, a map MAP in data-table format, in mathematical expression format, and/or program format; the maps MAP for the respective drive signal generators 36U, 36V, and 36W are for example stored in the memory 30ME.

The map MAP for the U-phase includes, as map data, predetermined waveforms of a drive signal, i.e. predetermined high- and low-level pulse patterns thereof, each correlating with a corresponding one of specified values of the modulation factor M for the U-phase.

Each of the high- and low-level pulse patterns of the drive signal for the U-phase includes high and low pulses, each of which correlates with a corresponding value of the angular range of the first phase ($\theta e + \phi$) of the U-phase reference angular signal $\theta U$ corresponding to one cycle, i.e. 360 degrees ($2\pi$), of the electrical rotational angle $\theta e$ of the rotor 10a.

The waveform of each of the high- and low-level pulse patterns of the drive signal for the U-phase is antisymmetric about 180 degrees ($\pi$) of the rotation angle $\theta e$ of the rotor 10a. Specifically, in each high- and low-level pulse pattern, if a pulse at any angle relative to 180 degrees within a first range from 180 to 0 degrees of the electrical rotational angle $\theta e$ is a high level, a pulse at the corresponding angle relative to 180 degrees within a second range from 180 to 360 degrees of the electrical rotational angle $\theta e$ is a low level, and vice versa.

This waveform of each of the high- and low-level pulse patterns of the drive signal for the U-phase is for example configured to induce a substantially sinusoidal U-phase voltage in the U-phase winding.

Additionally, pieces of map data, i.e. high- and low-level pulse patterns, of the drive signal for the U-phase are stored in the memory 30ME so as to correlate with the respective specified values of the modulation factor M.

The high level in each of the on-off pulse patterns of the drive signal for the U-phase represents an on instruction to switch on a corresponding U-phase switching element, and the low level represents an off instruction to switch off a corresponding U-phase switching element.

Like the U-phase, the map MAP for the V-phase includes, as map data, predetermined waveforms of a drive signal, i.e. predetermined high- and low-level pulse patterns thereof, each correlating with a corresponding one of specified values of the modulation factor M for the V-phase.

Each of the high- and low-level pulse patterns of the drive signal for the V-phase includes high and low pulses, each of which correlates with a corresponding value of the angular range of the second phase ($\theta e + \phi - 2\pi/3$) of the V-phase reference angular signal $\theta V$ corresponding to one cycle, i.e. 360 degrees ($2\pi$), of the electrical rotational angle $\theta e$ of the rotor 10a.

Similarly, like the U-phase, the map MAP for the W-phase includes, as map data, predetermined waveforms of a drive signal, i.e. predetermined high- and low-level pulse patterns thereof, each correlating with a corresponding one of specified values of the modulation factor M for the W-phase.

Each of the high- and low-level pulse patterns of the drive signal for the W-phase includes high and low pulses, each of which correlates with a corresponding value of the angular range of the second phase ($\theta e + \phi + 2\pi/3$) of the W-phase reference angular signal $\theta W$ corresponding to one cycle, i.e. 360 degrees ($2\pi$), of the electrical rotational angle $\theta e$ of the rotor 10a.

In particular, for each of the specified values of the modulation factor M, the waveform of a corresponding high- and low-level pulse pattern of the drive signal for the U-phase, the waveform of a corresponding high- and low-level pulse pattern of the drive signal for the V-phase, and the waveform of a corresponding high- and low-level pulse pattern of the drive signal for the W-phase are identical to each other.

Specifically, each of the U-, V-, and W-phase drive signal generator 36U selects a high- and low-level pulse pattern of the drive signal gUp in a corresponding map MAP for a corresponding one of the switching elements SUp, SVp, and SWp; the selected high- and low-level pulse pattern correlates with the calculated value of the modulation factor M.

Then, the U-phase drive signal generator 36U extracts a high- or low-level pulse, i.e. an on or off instruction, from the selected high- and low-level pulse pattern of the drive signal gUp according to every predetermined angular change of the U-phase reference angular signal $\theta U$, which is an example of phase information. That is, the extracted high- or low-level pulse corresponds to a present value of the U-phase reference angular signal $\theta U$.

Similarly, the V-phase drive signal generator 36V extracts a high- or low-level pulse, i.e. an on or off instruction, from the selected high- and low-level pulse pattern of the drive signal gVp according to every predetermined angular change of the V-phase reference angular signal $\theta V$, which is an example of phase information. That is, the extracted high- or low-level pulse corresponds to a present value of the V-phase reference angular signal $\theta V$.

In addition, the W-phase drive signal generator 36W extracts a high- or low-level pulse, i.e. an on or off instruction, from the selected high- and low-level pulse pattern of the drive signal gWp according to every predetermined angular change of the W-phase reference angular signal $\theta W$, which is an example of phase information. That is, the extracted high- or low-level pulse corresponds to a present value of the W-phase reference angular signal $\theta W$.

Note that each of the U-, V-, and W-phase drive signal generators 36U, 36V, and 36W automatically determines a high- or low-level pulse, i.e. an on or off instruction, of a corresponding one of the drive signals g&n as the reverse of the extracted high- or low-level pulse, i.e. on or off instruction extracted for the corresponding drive signal g&p.

Specifically, the U-phase drive signal generator 36U outputs, to the switching element SUp, (1) An on or off instruction of the corresponding drive signal gUp included in a selected common high- and low-level pulse pattern corresponding to a present value of the modulation factor M (2) The reverse of the on or off instruction of the drive signal gUp to the switching signal gUn as the drive signal gUn.

Retarded 120 electrical angular degrees in phase with respect to the output timing of the drive signal gUp, the V-phase drive signal generator 36V outputs, to the switching element SVp, (1) The same on or off instruction of the corresponding drive signal gVp included in the selected common high- and low-level pulse pattern corresponding to a present value of the modulation factor M (2) The reverse of the on or off instruction of the drive signal gVp to the switching signal gVn as the drive signal gVn.

Advanced 120 electrical angular degrees in phase with respect to the output timing of the drive signal gUp, the W-phase drive signal generator 36W outputs, to the switching element SWp, (1) The same on or off instruction of the corresponding drive signal gWp included in the selected common high- and low-level pulse pattern corresponding to a present value of the modulation factor M (2) The reverse of the on or off instruction of the drive signal gWp to the switching signal gWn as the drive signal gWn.

That is, the same on or off instructions are outputted to the respective switching elements SUp, SVp, and SWp with phase differences of 120 electrical degrees ($2\pi/3$) therebetween, and the same on or off instructions are outputted to the respective switching elements SUn, SVn, and SWn with phase differences of 120 electrical degrees ($2\pi/3$) therebetween. This controls on-off operations of the respective switches S&# such that sinusoidal U-, V-, and W-phase currents, which have phase differences of 120 electrical degrees therebetween, flow through the respective U-, V-, and W-phase windings of the starter of the motor-generator 10.

Figure 3:
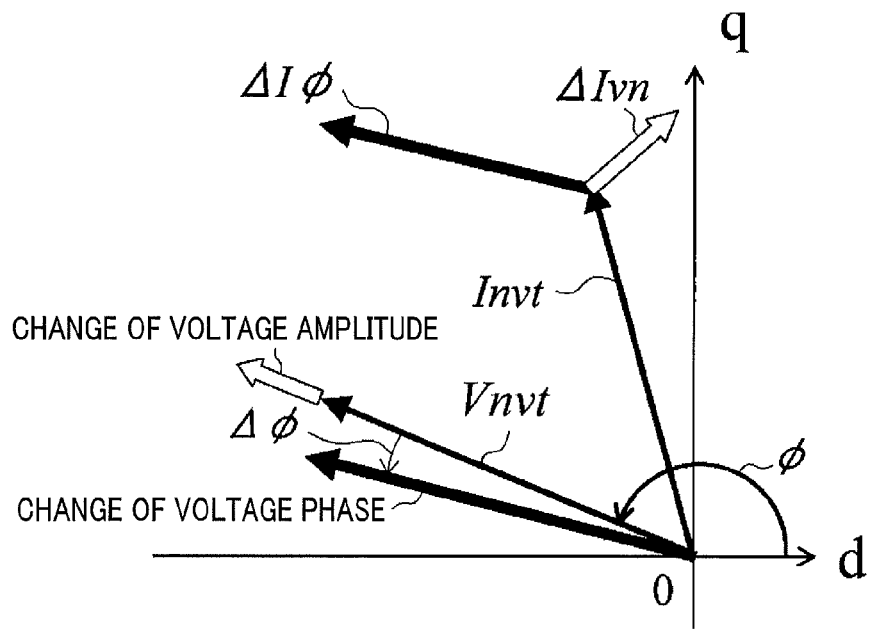
FIG. 3 is a graph schematically illustrating change of a current vector depending on an infinitesimal change of a voltage phase, and change of a current vector as a result of an infinitesimal change of the amplitude of an output voltage vector.
Figure 4:
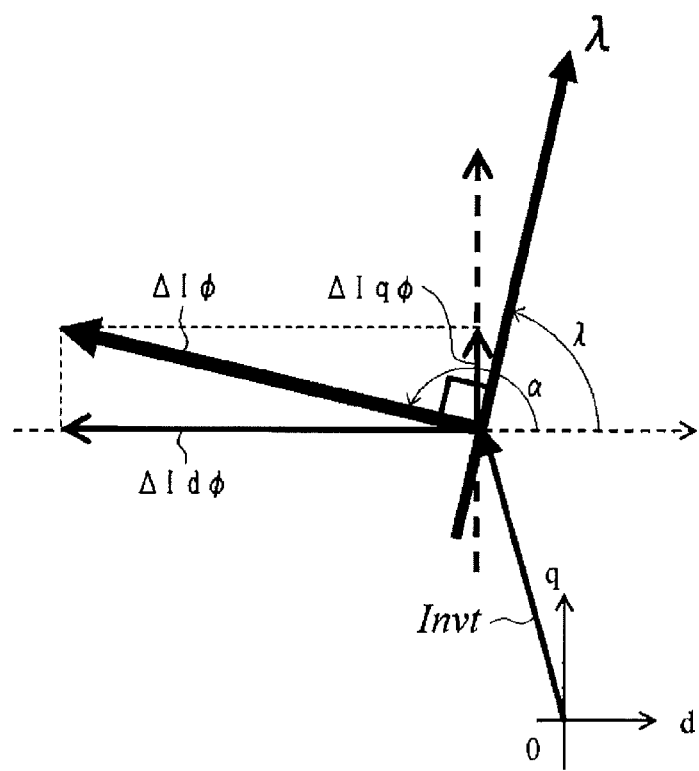
FIG. 4 is a graph, which is an enlarged view of the change the current vector depending on the infinitesimal change of the voltage phase illustrated in FIG. 3.
Figure 5:
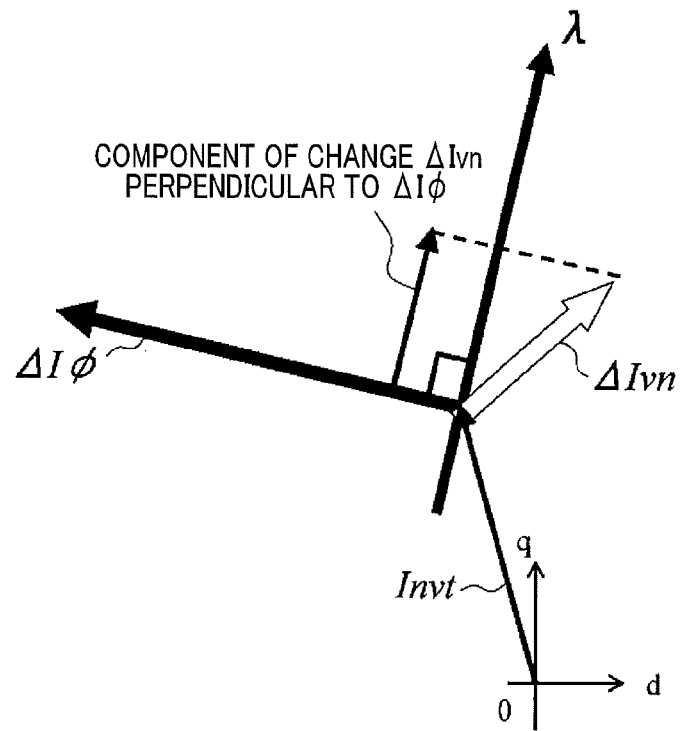
FIG. 5 is a graph schematically illustrating an λ-axis extending perpendicularly with respect to the changing direction of the current vector according to the first embodiment.

Next, the following describes how to design the correction calculator 32, which serves as, for example, a manipulated amplitude variable calculator, with reference to FIGS. 3 to 5.

The following equation [eq1] describes a voltage equation for a permanent-magnet synchronous motor:

$$\begin{bmatrix} Vd \\ Vq \end{bmatrix} = \begin{bmatrix} p \cdot Ld + R & -\omega \cdot Lq \\ \omega \cdot Ld & p \cdot Lq + R \end{bmatrix} \begin{bmatrix} Idr \\ Iqr \end{bmatrix} + \begin{bmatrix} 0 \\ \omega \cdot \psi \end{bmatrix} \quad [eq1]$$

Where p represents a differential operator, R represents the resistance of each-phase armature winding, Ld represents the inductance in the d-axis, Lq represents the inductance in the q-axis, and $\psi$ represents an rms value of permanent-magnet flux linkage to each-phase armature winding.

A steady state of the motor-generator 10, in which the rpm of the rotor 10a is kept constant, permits a transient state of the motor-generator 10 to be ignorable, resulting in the value of the differential operator p being set to zero. In the steady state of the motor-generator 10, it is assumed that the following conditions are satisfied:

(1) The rpm of the rotor 10a of the motor-generator 10 is a sufficiently high value (2) The resistance R of each-phase armature winding is sufficiently smaller than a value of $\omega \cdot Ld$, which is expressed by $R \ll \omega \cdot Ld$ (3) The resistance R of each-phase armature winding is sufficiently smaller than a value of $\omega \cdot Lq$, which is expressed by $R \ll \omega \cdot L_q$.

This assumption permits the following voltage equation [eq2] to be derived from the voltage equation [eq1]:

$$\begin{bmatrix} Vd \\ Vq \end{bmatrix} = \begin{bmatrix} 0 & -\omega \cdot Lq \\ \omega \cdot Ld & 0 \end{bmatrix} \begin{bmatrix} Idr \\ Iqr \end{bmatrix} + \begin{bmatrix} 0 \\ \omega \cdot \psi \end{bmatrix} \quad [eq2]$$

The correspondence among the d- and q-axis voltage components Vd and Vq, the voltage phase $\phi$, and the value of the amplitude Vn of the output voltage vector Vnvt is given by the following equation [eq3]:

$$\begin{bmatrix} Vd \\ Vq \end{bmatrix} = \begin{bmatrix} Vn \cdot \cos\phi \\ Vn \cdot \sin\phi \end{bmatrix} \quad [eq3]$$

A voltage equation of a permanent-magnet synchronous motor when the voltage phase $\phi$ changes by an infinitesimal value $\Delta\phi$ is expressed by the following equation [eq4] based on the equations [eq2] and [eq3]:

$$\begin{bmatrix} Vd\phi \\ Vq\phi \end{bmatrix} = \begin{bmatrix} 0 & -\omega \cdot Lq \\ \omega \cdot Ld & 0 \end{bmatrix} \begin{bmatrix} Id\phi \\ Iq\phi \end{bmatrix} + \begin{bmatrix} 0 \\ \omega \cdot \psi \end{bmatrix} \quad [eq4]$$

Where $Vd\phi = Vn \cos(\phi+\Delta\phi) = Vn(\cos\phi\cos\Delta\phi - \sin\phi\sin\Delta\phi) \approx Vd - \Delta\phi \cdot Vn\sin\phi$ $Vq\phi = Vn \sin(\phi+\Delta\phi) = Vn(\sin\phi\cos\Delta\phi + \cos\phi\sin\Delta\phi) \approx Vq + \Delta\phi \cdot Vn\cos\phi$ Subtracting the equation [eq2] from the equation [eq4] derives the following equation [eq5]:

$$\begin{bmatrix} Vd\phi - Vd \\ Vq\phi - Vq \end{bmatrix} = \begin{bmatrix} 0 & -\omega \cdot Lq \\ \omega \cdot Ld & 0 \end{bmatrix} \begin{bmatrix} Id\phi - Idr \\ Iq\phi - Iqr \end{bmatrix} \quad [eq5]$$

The value (id$\phi$−Idr) at the right side of the equation [eq5] represents a d-axis current change $\Delta Id\phi$, and the value (Iq$\phi$−Iqr) at the right side of the equation [eq5] represents a q-axis current change $\Delta Iq\phi$. Solving the equation [eq5] in terms of the d-axis current change $\Delta Id\phi$ and the q-axis current change $\Delta Iq\phi$ derives the following equation [eq6]:

$$\begin{bmatrix} \Delta Id\phi \\ \Delta Iq\phi \end{bmatrix} = \begin{bmatrix} 0 & -\omega \cdot Lq \\ \omega \cdot Ld & 0 \end{bmatrix} \begin{bmatrix} Vd\phi - Vd \\ Vq\phi - Vq \end{bmatrix} = \frac{Vn}{\omega} \begin{bmatrix} \frac{\cos\phi}{Ld} \\ \frac{\sin\phi}{Lq} \end{bmatrix} \Delta\phi \quad [eq6]$$

FIG. 3 illustrates the voltage vector Vnvt having the voltage phase $\phi$ and a current vector Invt based on the voltage vector Vnvt. A current vector Invt is defined as the square root of the sum of the square of a d-axis current Idr and the square of a q-axis current Iqr. FIG. 3 also illustrates change of the current vector Invt depending on an infinitesimal change $\Delta\phi$ of the voltage phase $\phi$ using reference character $\Delta I\phi$. FIG. 3 further illustrates change of the current vector Invt depending on an infinitesimal change $\Delta Vn$ of the amplitude Vn of the output voltage vector Vnvt using reference character $\Delta Ivn$.

FIG. 4 is an enlarged view of the change $\Delta I\phi$ of the current vector Invt depending on the infinitesimal change $\Delta\phi$ of the voltage phase $\phi$. The equation [eq6] permits the change direction $\alpha$ of the current vector Invt with respect to the d-axis depending on the infinitesimal change $\Delta\phi$ of the voltage phase $\phi$ to be expressed by the following equation [eq7]:

$$\alpha = \tan^{-1}\left(\frac{\Delta Iq\phi}{\Delta Id\phi}\right) = \tan^{-1}\left(\frac{Ld}{Lq}\tan\phi\right) \quad [eq7]$$

FIG. 4 shows that the arctangent operation in the equation [eq7] permits the change direction $\alpha$ of the current vector Invt with respect to the d-axis to be calculated between $-\pi$ and $+\pi$ inclusive.

The control apparatus 30 according to the first embodiment particularly calculates the change direction $\alpha$ of the current vector Invt with respect to the d-axis as $+\pi/2$ when the denominator of $$\frac{\Delta Iq\phi}{\Delta Id\phi}$$

at the right side of the equation [eq7] becomes zero and the numerator thereof becomes a positive value. The control apparatus 30 according to the first embodiment also calculates the change direction α of the current vector Invt with respect to the d-axis as −π/2 when the denominator of $$\frac{\Delta Iq\phi}{\Delta Id\phi}$$

at the right side of the equation [eq7] becomes zero and the numerator thereof becomes a negative value.

FIG. 5 illustrates a coordinate axis, which is referred to as a λ-axis, extending perpendicularly with respect to the changing direction of the current vector Invt. A λ-axis component of the change ΔIvn of the current vector Invt depending on the infinitesimal change ΔVn of the amplitude Vn of the output voltage vector Vnvt means a component of the change ΔIvn of the current vector Invt projected on the λ-axis. The λ-axis component of the change ΔIvn of the current vector Invt illustrated in FIG. 5 is a current independent from change of the voltage phase φ. The correction calculator 32 according to the first embodiment is designed to use the λ-axis component of the change ΔIvn of the current vector Invt for calculation of the amplitude correction ΔV. Using the λ-axis component of the change ΔIvn of the current vector Invt permits interference between the amplitude control and the phase control to be reduced. The angle λ between the d-axis and the λ-axis, which is required to set the λ-axis, is expressed by the following equation [eq8]:

$$\lambda = \alpha - \frac{\pi}{2} = \tan^{-1}\left(\frac{Ld}{Lq}\tan\phi\right) - \frac{\pi}{2} \quad [eq8]$$

Next, the following describes an example of the characteristic structure of the correction calculator 32 based on the design concept set forth above with reference to FIG. 2.

The correction calculator 32 includes a λ-axis setter 32a, a command current setter 32b, a λ-axis command current calculator 32c, a λ-axis actual current calculator 32d, a current deviation calculator 32e, and an amplitude correction calculator 32f.

The λ-axis setter 32a is operatively connected to the phase setter 30d. The λ-axis setter 32a calculates, based on the d- and q-axis inductances Ld and Lq and the voltage phase φ output from the phase setter 30d, the angle between the d-axis and a λ-axis in accordance with the equation [eq8]. The λ-axis serves as an interference reduction axis, i.e. a non-interference axis or an independent axis, in the d-q coordinate system. The λ-axis is configured such that a component of change of the current vector Invt, which is projected on the λ-axis, has reduced interferences, for example, no interferences or little interference, from change of the voltage phase φ. In other words, the component of change of the current vector Invt projected on the λ-axis is sufficiently free from interferences from change of the voltage phase φ. The λ-axis set by the λ-axis setter 32a changes depending on change of the driven conditions of the motor-generator 10. Note that the feature that the component of change of the current vector Invt, which is projected on the λ-axis, causes reduced interferences from change of the voltage phase φ can include that both (1) The λ-axis does not interfere at all from change of the voltage phase φ

(2) The λ-axis allows a minimum level of interference from change of the voltage phase φ unless the minimum level of interference reduces the controllability of the controlled variable, such as the estimated torque Te, of the motor-generator 10.

The command current setter 32b sets, based on the target torque, i.e. target torque, Trq*, a d-axis command current Id* and a q-axis command current Iq*. For example, the command current setter 32b according to the first embodiment carries out maximum torque control. Note that the maximum torque control is designed to always achieve a maximum torque at any value of the current vector Ivnt, in other words, most efficiently achieve the torque of the motor-generator 10 at any value of the current vector Ivnt.

Specifically, the command current setter 32b sets the d-axis command current Id* and a q-axis command current Iq* in accordance with the following equation [eq8a]:

$$Id^* = \frac{\psi}{2(Lq-Ld)} - \sqrt{\frac{\psi^2}{4(Lq-Ld)^2} + Iq^{*2}} \quad [eq8a]$$

For example, the maximum torque control is described on page 23 of "Design and Control of Interior Permanent Magnet Synchronous motor" authored by Takeda et al and published by Ohmsha, Ltd, at page 23.

The λ-axis command current calculator 32c is operatively connected to the λ-axis setter 32a and the command current setter 32b. The λ-axis command current calculator 32c calculates, based on the angle 2 set by the λ-axis setter 32a and the d- and q-axis command currents Id* and Iq* set by the command current setter 32b, a λ-axis command current Iλ* in accordance with the following equation [eq9] (see FIG. 6):

$$I\lambda^* = Id^* \cdot \cos\lambda + Iq^* \cdot \sin\lambda \quad [eq9]$$

Figure 6:
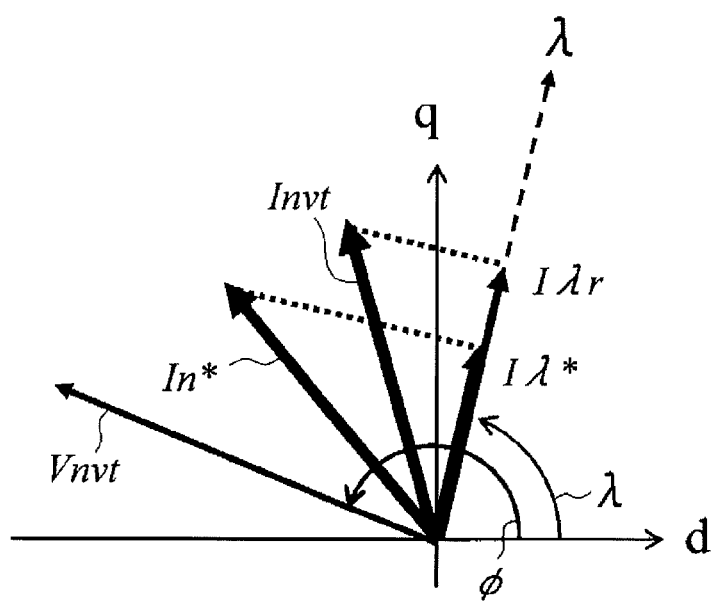
FIG. 6 is a graph schematically illustrating a λ-axis command current in a d-q-coordinate system according to the first embodiment.

Note that FIG. 6 illustrates an actual command current vector In* having the d- and q-axis axis command currents Id* and Iq*, and a present current vector Ivnt having a d-axis current Idr and a q-axis current Iqr actually obtained by the two-phase converter 30a.

The λ-axis actual current calculator 32d is operatively connected to the two-phase converter 30a and the λ-axis setter 32a. The λ-axis actual current calculator 32d calculates, based on the d-axis and q-axis currents Idr and Iqr obtained by the two-phase converter 30a and the angle λ set by the λ-axis setter 32a, an actual λ-axis current Iλr in accordance with the following equation [eq10] (see FIG. 6):

$$I\lambda r = Idr \cdot \cos\lambda + Iqr \cdot \sin\lambda \quad [eq10]$$

The λ-axis set by the λ-axis setter 32a changes depending on change of the driven conditions of the motor-generator 10. This causes the actual λ-axis current Iλr and the λ-axis command current Iλ* to change depending on change of the drive conditions of the motor-generator 10.

The current deviation calculator 32e is operatively connected to the λ-axis command current calculator 32c and the λ-axis actual current calculator 32d. The current deviation calculator 32e subtracts the λ-axis current Iλr from the λ-axis command current Iλ* to thereby calculate a current deviation AD, between the λ-axis current Dr and the λ-axis command current $i\lambda^*$. For example, a filter, for example, a low-pass filter, can be provided in the control apparatus 30. The filter can eliminate high-frequency components higher than a predetermined threshold frequency from the $\lambda$-axis current I$\lambda$r actually obtained by the $\lambda$-axis actual current calculator 32d. In this modification, the current deviation calculator 32e can subtract the corrected $\lambda$-axis current I$\lambda$r output of the filter from the $\lambda$-axis command current I$\lambda^*$ to thereby calculate the current deviation $\Delta$I$\lambda$ between the corrected $\lambda$-axis current I$\lambda$r and the $\lambda$-axis command current i$\lambda^*$.

The amplitude correction calculator 32f is operatively connected to the current deviation calculator 32e. The amplitude correction calculator 32f, which serves as, for example, an amplitude setter, calculates, based on the current deviation $\Delta$I$\lambda$, the amplitude correction $\Delta$V serving as a manipulated variable for feedback controlling the $\lambda$-axis current I$\lambda$r to match with the $\lambda$-axis command current I$\lambda^*$, in other words, for feedback controlling the estimated torque Te to match with the target torque Trq*.

Specifically, in the first embodiment, the amplitude correction calculator 32f calculates the amplitude correction $\Delta$V in accordance with a predetermined proportional gain and a predetermined integral gain of a PI feedback control algorithm (PI algorithm) using the current deviation $\Delta$I$\lambda$ as its input.

In the PI algorithm, the amplitude correction $\Delta$V is expressed based on the sum of an output, i.e. a proportional gain term, of a proportional unit based on the proportional gain and an output, i.e. an integral gain term, of an integrator based on the integral gain.

The proportional gain for the amplitude correction $\Delta$V contributes to change in the amplitude correction $\Delta$V in proportion to the temporal current deviation $\Delta$I$\lambda$ from a target value of zero.

The integral gain is proportional to an accumulated offset of instantaneous values of the current deviation $\Delta$I$\lambda$ over time to reset the accumulated offset (steady-state deviation) over time to zero.

The configuration of the control apparatus 30 calculates the amplitude correction $\Delta$V based on the $\lambda$-axis current I$\lambda$r in the $\lambda$-axis, which is a non-interference axis having no or little interference from change of the voltage phase 11), thus reducing interference between the amplitude control and the phase control. This configuration permits the proportional gain and the integral gain of the amplitude correction calculator 32f to increase. This gain increase improves a response, i.e. a response performance, of the feedback control in the amplitude control up to a level identical to a level of the response of the feedback control in the phase control. This improvement permits the control apparatus 30 to maintain both higher controllability of the torque of the motor-generator 10, and higher controllability of the three-phase currents flowing in the motor-generator 10 even if a disturbance having an influence on the voltage amplitude Vn occurs, or the target torque Trq* transiently changes.

The configuration of the control apparatus 30 also maintains both higher controllability of the torque of the motor-generator 10, and higher controllability of the three-phase currents flowing in the motor-generator 10 even if the feedforward control of the torque of the motor-generator 10 to match with the target torque Trq* is improperly carried out. The improperly execution of the feedforward control includes a case where the information F2 used by the command-voltage setter 30h is inappropriately determined.

The following describes the reasons why the control apparatus 30 incorporates therein the harmonic signal generator 34.

As described above, the control apparatus 30 is designed to cause sinusoidal U-, V-, and W-phase currents, which have phase differences of 120 electrical degrees therebetween, to flow through the respective U-, V-, and W-phase windings of the starter of the motor-generator 10 on the precondition that (a) Magnetic characteristics of the motor-generator 10, which include the d- and q-axis inductances Ld and Lq and an induced-voltage constant, are ideal magnetic characteristics (2) The ideal magnetic characteristics can induce ideal sinusoidal three-phase voltages from the respective three-phase windings.

This achieves required torque of the motor-generator 10 with reduced harmonic torque components.

Unfortunately, the magnetic characteristics of the motor-generator 10 may have gaps with respect to the ideal magnetic characteristics due to various causes including the variations in the d- and q-axis inductances Ld and Lq and/or the induced-voltage constant. These gaps may cause each of the U-, V-, and W-phase currents IU, IV, and IW to include harmonic current components as expressed by the following equations [eq11.]:

$$\begin{bmatrix} IU \\ IV \\ IW \end{bmatrix} = \begin{bmatrix} Ir1 \cdot \cos(\theta e + \phi 1) + Irk \cdot \cos(k \cdot \theta e + \phi k) \\ Ir1 \cdot \cos\left(\theta e - \frac{2}{3}\pi + \phi 1\right) + Irk \cdot \cos\left(k \cdot \theta e - \frac{2}{3}\pi + \phi k\right) \\ Ir1 \cdot \cos\left(\theta e + \frac{2}{3}\pi + \phi 1\right) + Irk \cdot \cos\left(k \cdot \theta e + \frac{2}{3}\pi + \phi k\right) \end{bmatrix} \quad [eq11]$$

Where the right-hand first term of each of the equations [11] represents a fundamental current component having the amplitude of Ir1 and the phase of $\phi$1 of a corresponding one of the U-, V-, and W-phases. The right-hand second term of each of the equations [11] represents harmonic current components having the amplitude of Ir and the phase of $\phi$k of a corresponding one of the U-, V-, and W-phases. In other words, the right-hand second term of each of the equations [11] represents that k-th, i.e. (1±6n)-th, harmonic current components are included in each of the U-, V-, and W-phases.

The reference character k is defined as 1±6n where n is an integer other than zero. Harmonic current components, which change at an electrical angular velocity that is k-times higher than the electrical angular velocity $\omega$ of the rotor 10a, will also be referred to as k-th order harmonic current components or k-th higher-order harmonic current components. That is, the right-hand second term of each of the equations [11] represents k-th order harmonic current components.

The following equation [12] permits the U-, V-, and W-phase currents IU, IV, and IW each including such k-th order harmonic current components to be transformed to d- and q-axis currents Id and Iq in the first-order rotating coordinate system:

$$\begin{bmatrix} Id \\ Iq \end{bmatrix} = \begin{bmatrix} \cos\theta e & \cos\left(\theta e - \frac{2}{3}\pi\right) & \cos\left(\theta e + \frac{2}{3}\pi\right) \\ -\sin\theta e & -\sin\left(\theta e - \frac{2}{3}\pi\right) & -\sin\left(\theta e + \frac{2}{3}\pi\right) \end{bmatrix} \begin{bmatrix} IU \\ IV \\ IW \end{bmatrix} \quad [eq12]$$

-continued $$= \begin{bmatrix} Ir1 \cdot \cos\phi 1 + Irk \cdot \cos[(k-1)\theta e + \phi k] \\ Ir1 \cdot \sin\phi 1 + Irk \cdot \sin[(k-1)\theta e + \phi k] \end{bmatrix}$$

The equation [12] shows that k-th, i.e. (1±6n)-th, harmonic current components included in each of the U-, V-, and W-phase currents IU, IV, and IW in the three-phase fixed coordinate system cause (k−1)-th, i.e. ±6n-th, harmonic current components to be included in each of the d- and q-axis currents Id and Iq in the first-order rotating coordinate system. These (k−1)-th, i.e. ±6n-th, harmonic current components might increase torque variations and/or loss, i.e. iron loss, of the motor-generator 10 if they flowed in the motor-generator 10.

Superimposing harmonic signals on each of the reference angular signals θU, θV, and θW, which is input to a corresponding one of the drive signal generators 36U, 36V, and 36W, induce, on each phase winding of the motor-generator 10, harmonic voltages having an angular velocity identical to the angular velocity of the superimposed harmonic signals. The induced harmonic voltages having the angular velocity identical to the angular velocity of the superimposed harmonic signals result in harmonic current components, which have an angular velocity identical to the angular velocity of the superimposed harmonic signals, flowing in each of the stator windings of the motor-generator 10.

From these characteristics, superimposing harmonic signals, which can cancel or reduce target harmonic current components, on each of the reference angular signals θU, θV, and θW, permits the target harmonic current components to be cancelled or reduced.

Usual three-phase motor-generators prominently generate (k−1)-th, which is equal to ±6-th, order harmonic current components in the first-order rotating coordinate system, which may have significant impacts on torque of the motor-generator 10.

Thus, the first embodiment aims to reduce such target (k−1)-th, which is equal to ±6-th, order harmonic current components included in each of the d- and q-axis currents in the first-order rotating coordinate system.

That is, superimposing counteracting (k−1)-th, which is equal to 6-th, order harmonic current components on each of the d- and q-axis currents in the first-order rotating coordinate can reduce target (−6)-th order harmonic current components included in a corresponding one of the d- and q-axis currents in the first-order rotating coordinate system. In other words, superimposing counteracting k (=7)-th order harmonic current components on each of the U-, V, and W-phase currents in the three-phase fixed coordinate system enables the counteracting 7-th order harmonic current components to counteract the target (−6)-th order harmonic current components included in each of the d- and q-axis currents in the first-order rotating coordinate system.

In addition, superimposing counteracting (k−1)-th, which is equal to −6-th, order harmonic current components on each of the d- and q-axis currents in the first-order rotating coordinate can reduce target 6-th order harmonic current components included in a corresponding one of the d- and q-axis currents in the first-order rotating coordinate system. In other words, superimposing the counteracting k (=−5)-th order harmonic current components on each of the U-, V, and W-phase currents in the three-phase fixed coordinate system enables the (−5)-th order harmonic current components to counteract the target 6-th order harmonic current components included in each of the d- and q-axis currents in the first-order rotating coordinate system.

Specifically, the harmonic current generator 34 of the first embodiment is configured to generate the fluctuating signal Sigf for superimposing counteracting k (=−5 or 7)-th order harmonic current components on each of the U-, V, and W-phase currents in the three-phase fixed coordinate system. This aims to reduce the target 6-th or −6-th order harmonic current components included in a corresponding one of the d- and q-axis currents in the first-order rotating coordinate system.

Note that, if the polarity of k-th order harmonic currents for respective phase currents is positive, i.e. k>0, the k-th order harmonic currents for the respective phase currents change with positive change of the electrical rotational angle θe of the rotor 10a in the first order of U-, V-, and W-phases. This order agrees with the order of the fundamental current components of the respective U, V, and W-phases. In other words, the travelling direction of the k-th order harmonic currents is identical to that of the fundamental current components if k>0.

In contrast, if the polarity of k-th order harmonic currents for respective phase currents is negative, i.e. k<0, the k-th order harmonic currents for the respective phase currents change with positive change of the electrical rotational angle θe of the rotor 10a in the second order that is opposite to the first order. In other words, the travelling direction of the k-th order harmonic currents is opposite to that of the fundamental current components if k<0.

Figure 7:
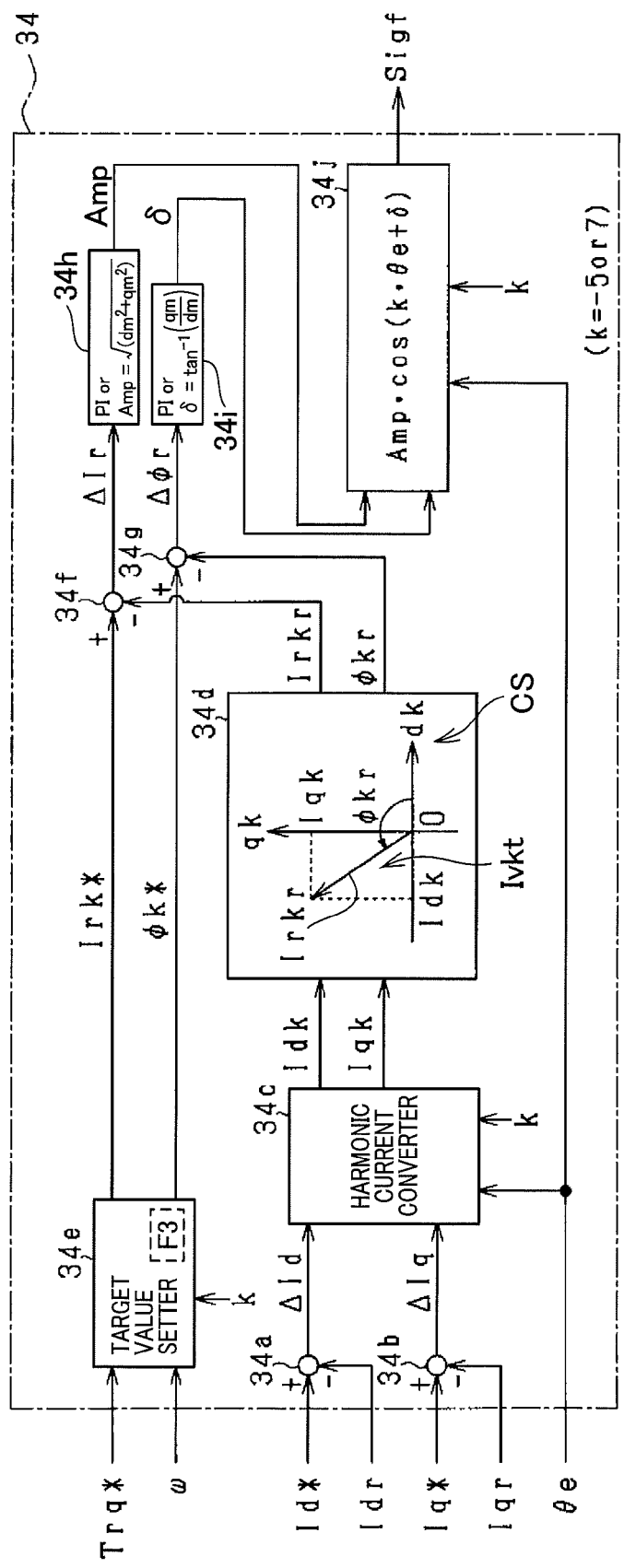
FIG. 7 is a block diagram schematically illustrating an example of the structure of a harmonic signal generator illustrated in FIG. 2.

Next, the following describes an example of the characteristic structure of the harmonic signal generator 34 with reference to FIG. 7.

As illustrated in FIG. 7, the harmonic signal generator 34 includes a d-axis deviation calculator 34a, a q-axis deviation calculator 34b, a harmonic current converter 34c, an amplitude-phase calculator 34d, and a target value setter 34e. The harmonic signal generator 34 also includes an amplitude deviation calculator 34f, a phase deviation calculator 34g, an amplitude feedback controller 34h, a phase feedback controller 34i, and a signal generator 34j.

The d-axis deviation calculator 34a, which serves as, for example, a target harmonic current obtainer, calculates a d-axis current deviation, i.e. d-axis harmonic components, ΔId that is a deviation between the d-axis command current Id* output from the command current setter 32b and the d-axis current Idr output from the two-phase converter 30a. Specifically, the d-axis deviation calculator 34a subtracts the d-axis current Idr from the d-axis command current Id* to thereby calculate the d-axis current deviation ΔId, which serves as, for example, d-axis harmonic current components.

The q-axis deviation calculator 34b, which serves as, for example, a target harmonic current obtainer, calculates a q-axis current deviation, i.e. q-axis harmonic components, ΔIq that is a deviation between the q-axis command current Iq* output from the command current setter 32b and the q-axis current Iqr output from the two-phase converter 30a. Specifically, the q-axis deviation calculator 34b subtracts the q-axis current Iqr from the q-axis command current Iq* to thereby calculate the q-axis current deviation ΔIq, which serves as, for example, q-axis harmonic current components.

The harmonic current converter 34c is operatively connected to the d- and q-axis deviation calculators 34a and 34b. The harmonic current converter 34c serves as, for example, a target harmonic current obtainer, and, in particular, a harmonic-current component calculator. Specifically, the harmonic current converter 34c converts the d- and q-axis current deviations ΔId and ΔIq in the first-order rotating coordinate system into d- and q-axis k-th order harmonic currents Idk and Iqk in a k-th order harmonic rotating coordinate system using the following equations [eq13] and [eq14]:

$$Idk = \Delta Id \cdot \cos[(k-1)\theta e] + \Delta Iq \cdot \sin[(k-1)\theta e] \quad [\text{eq13}]$$

$$Iqk = -\Delta Iq \cdot \sin[(k-1)\theta e] + \Delta Iq \cdot \cos[(k-1)\theta e] \quad [\text{eq14}]$$

Where the right-hand "(k−1)θe" in each of the equations [eq13] and [eq14] represents the phase difference between the d-axis of the first-order rotating coordinate system and the harmonic rotating coordinate system.

Note that the k-th order harmonic rotating coordinate system CS (see the block 34d in FIG. 7) is defined as a coordinate system that (1) Has a dk axis as its horizontal axis and a qk axis as its vertical axis (2) Rotates at an angular velocity that is identical to a fluctuating angular velocity of k-th order harmonic current components in the three-phase fixed-coordinate system.

Particularly, the harmonic current converter 34c converts the d- and q-axis current deviations ΔId and ΔIq in the first-order rotating coordinate system into the d- and q-axis k-th order harmonic currents Idk and Iqk in the k-th order harmonic rotating coordinate system while the k is set to −5 or 7.

The amplitude-phase calculator 34d is operatively connected to the harmonic current converter 34c. The amplitude-phase calculator 34d, which serves as, for example, an amplitude and phase calculator, calculates, based on the d- and q-axis k-th order harmonic currents Idk and Iqk, an amplitude Irkr and a phase φkr of a k-th order harmonic current vector Ivkt in the k-th order harmonic rotating coordinate system CS in accordance with the following equations [eq15a] and [eq15b]:

$$Irkr = \sqrt{Idk^2 + Iqk^2} \quad [\text{eq15a}]$$

$$\phi kr = \tan^{-1}\left(\frac{Iqk}{Idk}\right) \quad [\text{eq15b}]$$

The arctangent operation in the equation [eq15b] permits the phase φkr of the k-th order harmonic current vector Ivkt to be calculated between −π and +π inclusive. In particular, the amplitude-phase calculator 34d according to the first embodiment calculates the phase φkr of the k-th order harmonic current vector Ivkt as +π/2 when the denominator of $$\frac{Iqk}{Idk}$$

at the right hand of the equation [eq15b] becomes zero and the numerator thereof becomes a positive value. The amplitude-phase calculator 34d also calculates the phase φkr of the k-th order harmonic current vector Ivkt as −π/2 when the denominator of $$\frac{Iqk}{Idk}$$

at the right hand of the equation [eq15b] becomes zero and the numerator thereof becomes a negative value.

The target value setter 34e serves as, for example, a target-value setter to variably set a target amplitude Irk* and a target phase φk* for the k-th order harmonic current vector Ivkt according to the target torque Trq* output from the control system 26 and the electrical angular velocity ω output from the velocity calculator 30i. In particular, the target value setter 34e of the first embodiment sets the target amplitude Irk* for the k-th order harmonic current vector Ivkt such that the target amplitude Irk* increases with an increase of the target torque Trq*. The target value setter 34e variably sets the target amplitude Irk* and target phase φk* for the k-th order harmonic current vector Ivkt to thereby reduce torque variations and/or iron loss of the motor-generator 10. For example, the target value setter 34e has information F3 in data-table (map) format, in mathematical expression format, and/or program format.

The information F3, which is for example stored in the memory 30ME, includes a function, i.e. a correlation, of values of the target amplitude Irk* of the k-th order harmonic current vector Ivkt with respect to values of the target torque Trq*; and values of the electrical angular velocity ω. The information F3 also includes a function, i.e. a correlation, of values of the target phase φk* of the k-th order harmonic current vector Ivkt with respect to values of the target torque Trq*; and values of the electrical angular velocity ω.

The target value setter 34e can retrieve a value of the target amplitude Irk* of the k-th order harmonic current vector Ivkt corresponding to an actual value of the target torque Trq* and an actual value of the electrical angular velocity ω. The target value setter 34e can also retrieve a value of the target phase φk* of the k-th order harmonic current vector Ivkt corresponding to the actual value of the target torque Trq* and the actual value of the electrical angular velocity ω.

The amplitude deviation calculator 34f is operatively connected to the amplitude-phase calculator 34d and the target value setter 34e. The amplitude deviation calculator 34f, which serves as, for example, a reference amplitude calculator, calculates an amplitude deviation ΔIr that is a deviation between the target amplitude Irk* and the amplitude Irkr of the k-th order harmonic current vector Ivkt. Specifically, the amplitude deviation calculator 34f subtracts the amplitude Irkr from the target amplitude Irk* to thereby calculate the amplitude deviation ΔIr.

The phase deviation calculator 34g is operatively connected to the amplitude-phase calculator 34d and the target value setter 34e. The phase deviation calculator 34g, which serves as, for example, a reference phase calculator, calculates a phase deviation Δφr that is a deviation between the target phase φk* and the phase φkr of the k-th order harmonic current vector Ivkt. Specifically, the phase deviation calculator 34g subtracts the phase φkr from the target phase φk* to thereby calculate the phase deviation Δφr.

The amplitude feedback controller 34h is operatively connected to the amplitude deviation calculator 34f. The amplitude feedback controller 34h, which serves as, for example, a reference amplitude calculator, calculates, based on the amplitude deviation ΔIr, a reference amplitude Amp for the fluctuating signal Sigf serving as a manipulated variable for feedback controlling the amplitude Irkr to match with the target amplitude Irk*. Specifically, in the first embodiment, the amplitude feedback controller 34h calculates the reference amplitude Amp in accordance with a predetermined proportional gain and a predetermined integral gain of a PI feedback control algorithm (PI algorithm) using the amplitude deviation ΔIr as its input.

In the PI algorithm, the reference amplitude Amp is expressed based on the sum of an output, i.e. a proportional gain term, of a proportional unit based on the proportional gain and an output, i.e. an integral gain term, of an integrator based on the integral gain.

The proportional gain for the reference amplitude Amp contributes to change in the reference amplitude Amp in proportion to the temporal amplitude deviation ΔIr from a target value of zero.

The integral gain is proportional to an accumulated offset of instantaneous values of the amplitude deviation ΔIr over time to reset the accumulated offset (steady-state deviation) over time to zero.

The phase feedback controller 34i is operatively connected to the phase deviation calculator 34g. The phase feedback controller 34i, serves as, for example, a reference phase calculator, calculates, based on the phase deviation Δϕr, a reference phase δ for the fluctuating signal Sigf serving as a manipulated variable for feedback controlling the phase ϕkr to match with the target phase ϕk*. Specifically, in the first embodiment, the phase feedback controller 34i calculates the reference phase 6 in accordance with a predetermined proportional gain and a predetermined integral gain of a PI feedback control algorithm (PI algorithm) using the phase deviation Δϕr as its input.

In the PI algorithm, the reference phase δ is expressed based on the sum of an output, i.e. a proportional gain term, of a proportional unit based on the proportional gain and an output, i.e. an integral gain term, of an integrator based on the integral gain.

The proportional gain for the reference phase δ contributes to change in the reference phase δ in proportion to the temporal phase deviation Δϕr from a target value of zero.

The integral gain is proportional to an accumulated offset of instantaneous values of the phase deviation Δϕr over time to reset the accumulated offset (steady-state deviation) over time to zero.

The signal generator 34j is operatively connected to the amplitude feedback controller 34h and to the phase feedback controller 34i. The signal generator 34j generates the fluctuating signal Sigf according to the reference amplitude Amp, the reference phase δ, and the electrical rotational angle θe measured by the rotational angle sensor 46 for every control period of the control apparatus 30. For example, the fluctuating signal Sigf is a cosine signal having (1) The reference amplitude Amp as its amplitude (2) The sum of the reference phase δ and the product between the electrical rotational angle θe and k as its argument, i.e. independent variable, k representing the order of the k-th order harmonic current vector Ivkt, as expressed by the following equation [eq16]:

$$Sigf = Amp \cdot \cos(k \cdot \theta e + \delta) \quad [eq16]$$

The fluctuating signal Sigf is a cosine signal, and such a cosine signal can be expressed as a sinusoidal signal by shifting in phase the cosine signal by π/2. That is, such a cosine signal or a sinusoidal signal is one of the periodic trigonometric-function signals.

As described above, the harmonic signal generator 34 of the control apparatus 30 generates the fluctuating signal Sigf with k being set to 7 or −5, and outputs the fluctuating signal Sigf with k being set to 7 or −5 to each of the U-, V-, and W-phase superimposers 32U, 32V, and 32W. This results in each of the U-phase reference angular signal θU with the first phase (θe+ϕ), the V-phase reference angular signal θV with the second phase (θe+ϕ−2π/3), and the W-phase reference angular signal θW with the third phase (θe+ϕ+2π/3) having the fluctuating signal Sigf superimposed thereon.

As described above, each of the U-, V-, and W-phase signal generator 36U, 36V, and 36W extracts a high- or low-level pulse from a selected high- and low-level pulse pattern of a corresponding drive signal according to every predetermined angular change of a corresponding reference angular signal that changes with change of the fluctuating signal Sigf.

This therefore induces, on each phase winding of the motor-generator 10, harmonic voltages having an angular velocity identical to the angular velocity of the superimposed fluctuating signal Sigf. The induced harmonic voltages having the angular velocity identical to the angular velocity of the superimposed fluctuating signal Sigf result in counteracting harmonic current components, which have an angular velocity identical to the angular velocity of the superimposed fluctuating signal Sigf, flowing in each of the stator windings of the motor-generator 10.

That is, the modules 32U to 32W and 34d to 34j serve as, for example, an inducing unit.

In particular, setting k of the fluctuating signal Sigf to −5, which is superimposed on each of the U-, V-, and W-phase reference angular signals θU, θV, and θW, generates counteracting −6-th harmonic current components superimposed in each of the d- and q-axis currents. The counteracting −6-th harmonic current components in each of the d- and q-axis currents reduces the target +6-th order harmonic current components included in a corresponding one of the d- and q-axis currents in the first-order rotating coordinate system.

Additionally, setting k of the fluctuating signal Sigf to +7, which is superimposed on each of the U-, V-, and W-phase reference angular signals θU, θV, and θW, generates counteracting +6-th harmonic current components superimposed in each of the d- and q-axis currents. The counteracting +6-th harmonic current components in each of the d- and q-axis currents reduces the target −6-th order harmonic current components included in a corresponding one of the d- and q-axis currents in the first-order rotating coordinate system.

Reducing the target +6-th harmonic current components or the target −6-th harmonic current components induced in each of the d- and q-axis currents reduces torque variations and/or loss, i.e. iron loss, of the motor-generator 10 due to the target +6-th harmonic current components or the target −6-th harmonic current components.

Moreover, the harmonic signal generator 34 of the control apparatus 30 variably sets, according to the target torque Trq* and the electrical angular velocity ω, the target amplitude Irk* and target phase ϕk* for the k-th order harmonic current vector Ivkt to reduce torque variations and/or iron loss of the motor-generator 10. Then, the harmonic signal generator 34 adjusts the reference amplitude Amp and the controlled phase δ of the fluctuating signal Sigf such that the amplitude Irkt and phase ϕkr of the k-th order harmonic current vector Ivkt match with the respective target amplitude Irk* and target phase ϕk*.

This configuration of the harmonic signal generator 34 further contributes to more reduction of torque variations and/or loss, i.e. iron loss, of the motor-generator 10 due to the target −6-th harmonic current components or the target 6-th harmonic current components.

Second Embodiment

A control apparatus 30A for the motor-generator 10 according to the second embodiment of the present disclosure will be described with reference to FIG. 8.

Some of the structure and/or functions of the control apparatus 30A according to the second embodiment are different from the control apparatus 30 according to the first embodiment by the following points. So, the different points will be mainly described hereinafter.

The control apparatus 30A includes a harmonic signal generator 34A. The harmonic signal generator 34A of the second embodiment is configured to generate (1) A first fluctuating signal Sig1 for superimposing k (=−5)-th order harmonic current components on each of the U-, V, and W-phase currents in the three-phase fixed coordinate system (2) A second fluctuating signal Sig2 for superimposing k (=7)-th order harmonic current components on each of the U-, V, and W-phase currents in the three-phase fixed coordinate system.

This aims to reduce both the target ±6-th order harmonic current components included in each of the d- and q-axis currents in the first-order rotating coordinate system.

Figure 8:
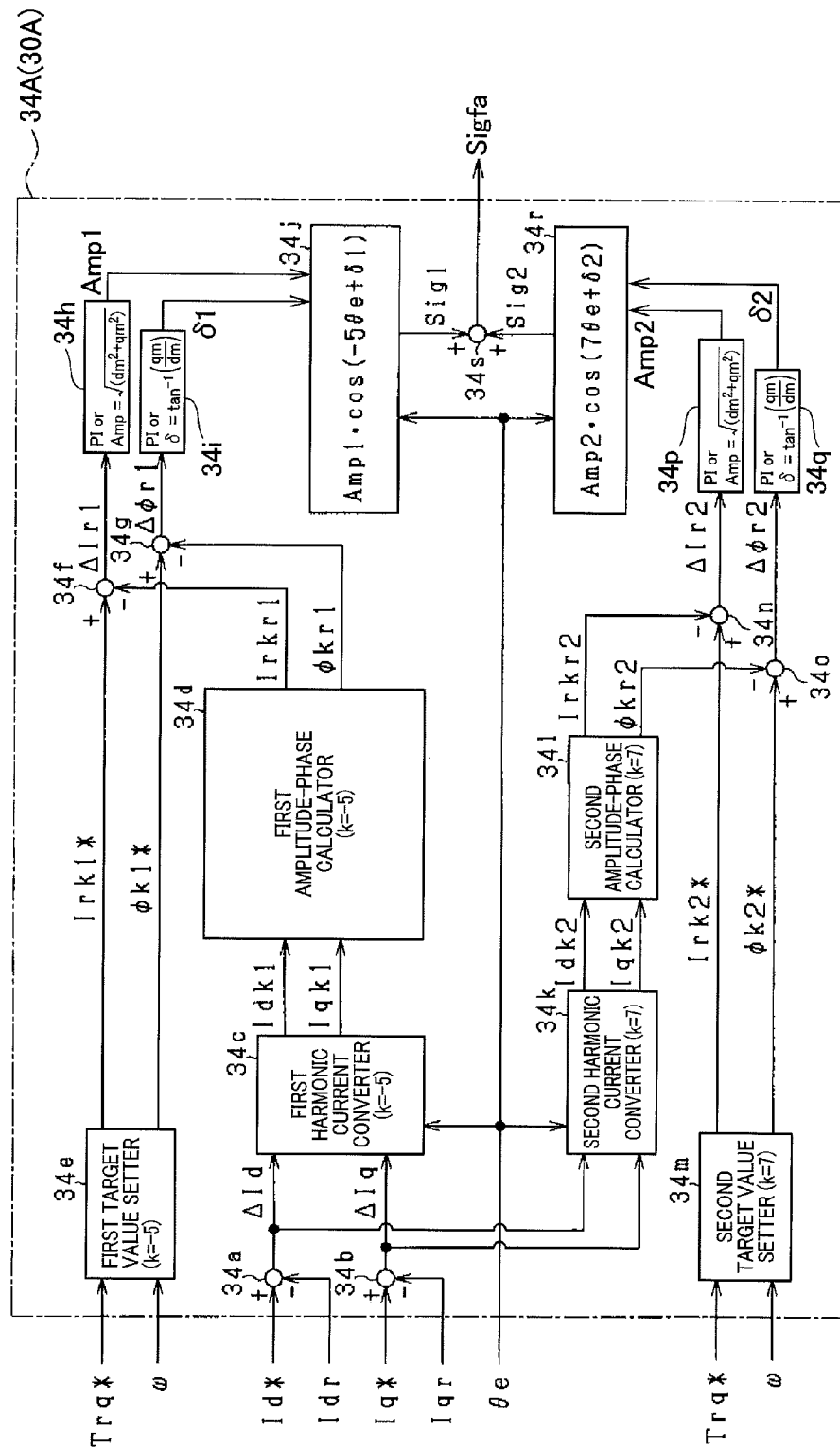
FIG. 8 is a block diagram schematically illustrating an example of the structure of a harmonic signal generator of a control apparatus according to the second embodiment of the present disclosure.

Next, the following describes an example of the characteristic structure of the harmonic signal generator 34A with reference to FIG. 8. In FIG. 8, identical modules between the harmonic signal generator 34A and the harmonic signal generator 34 illustrated in FIG. 7, to which identical reference characters are assigned, are omitted in description, and the different modules will be mainly described hereinafter.

The second embodiment describes the modules 34c, 34d, 34e, and 34f illustrated in FIG. 7 as respective first harmonic current converter 34c, first amplitude-phase calculator 34d, first target value setter 34e, and first amplitude deviation calculator 34f. The second embodiment also describes the modules 34g, 34h, 34i, and 34j illustrated in FIG. 7 as respective first phase deviation calculator 34g, first amplitude feedback controller 34h, first phase feedback controller 34i, and first signal generator 34j.

The d- and q-axis k-th order harmonic currents Idk and Iqk output from the first harmonic current converter 34c will be referred to as first d- and q-axis k-th order harmonic currents Idk1 and Iqk1. The amplitude Irkr and phase φkr of the k-th order harmonic current vector Ivkt output from the first amplitude-phase calculator 34d will be referred to as a first amplitude Irkr1 and a first phase φkr1 of a first k-th order harmonic current vector Ivkt1. The target amplitude Irk* and target phase φk* for the k-th order harmonic current vector Ivkt output from the first target value setter 34e will be referred to as a first target amplitude Irk1* and a first target phase φk1* for the first k-th order harmonic current vector Ivkt1.

The amplitude deviation ΔIr output from the first amplitude deviation calculator 34f will be referred to as a first amplitude deviation ΔIr1, and the phase deviation Δφr output from the phase deviation calculator 34g will be referred to as a first phase deviation Δφr1.

The reference amplitude Amp output from the first amplitude feedback controller 34h will be referred to as a first reference amplitude Amp1, and the reference phase δ output from the first phase feedback controller 34i will be referred to as a first reference phase δ1.

The fluctuating signal Sigf output from the first signal generator 34j will be referred to as the first fluctuating signal Sig1 for superimposing k (=−5)-th order harmonic current components on each of the U-, V, and W-phase currents in the three-phase fixed coordinate system. Thus, the k-th order harmonic rotating coordinate system used for the first harmonic current converter 34c, which will be referred to as a first k-th order harmonic rotating coordinate system, is defined as a coordinate system that (1) Has a dk axis as its horizontal axis and a qk axis as its vertical axis (2) Rotates at an angular velocity identical to an angular velocity of the k (=−5)-th order harmonic current components in the three-phase fixed coordinate system in accordance with the following equation [eq17]:

$$Sig1 = Amp1 \cdot \cos(-5 \cdot \theta e + \delta 1) \qquad [eq17]$$

Additionally, the harmonic signal generator 34A includes a second harmonic current converter 34k, a second amplitude-phase calculator 34l, a second target value setter 34m, a second amplitude deviation calculator 34n, a second phase deviation calculator 34o, a second amplitude feedback controller 34p, a second phase feedback controller 34q, and a second signal generator 34r. These modules 34k to 34r generate the second fluctuating signal Sig2 for superimposing k (=7)-th order harmonic current components on each of the U-, V, and W-phase currents in the three-phase fixed coordinate system. That is, operations of these modules 34k to 34r are substantially identical to those of the modules 34c to 34j except that the parameter k representing the order of the harmonic current components to be superimposed on each phase current is set to 7.

Specifically, the second harmonic current converter 34k, which serves as, for example, a target harmonic current obtainer, and, in particular, a harmonic-current component calculator. Specifically, the second harmonic current converter 34k converts the d- and q-axis current deviations ΔId and ΔIq in the first-order rotating coordinate system into second d- and q-axis k-th order harmonic currents Idk2 and Iqk2 in a second k-th order harmonic rotating coordinate system using the above equations [eq13] and [eq14]. In the equation [eq13], Idk is replaced with Idk2, and, in the equation [eq14], Iqk is replaced with Iqk2. Note that the second k-th order harmonic rotating coordinate system is defined as a coordinate system that (1) Has a dk axis as its horizontal axis and a qk axis as its vertical axis (2) Rotates at an angular velocity identical to an angular velocity of the k (=7)-th order harmonic current components in the three-phase fixed coordinate system.

The second amplitude-phase calculator 34l, which serves as, for example, an amplitude and phase calculator, calculates, based on the second d- and q-axis k-th order harmonic currents Idk and Iqk, a second amplitude Irkr2 and a second phase φkr2 of a second k-th order harmonic current vector Ivkt2 in the second k-th order harmonic rotating coordinate system in accordance with the above equations [eq15a] and [eq15b]. Note that, in the equation [15a], Irkr is deemed to be replaced with Irkr2, and, in the equation [15b], φkr is deemed to be replaced with φkr2.

The second target value setter 34m serves as, for example, a target-value setter to variably set a second target amplitude Irk* and a second target phase φk* for the second k-th order harmonic current vector Ivkt2 according to the target torque Trq* output from the control system 26 and the electrical angular velocity ω output from the velocity calculator 30i.

The second amplitude deviation calculator 34n calculates a second amplitude deviation ΔIr2 that is a deviation between the second target amplitude Irk* and the second amplitude Irkr2 of the second k-th order harmonic current vector Ivkt2.

The second phase deviation calculator 34o calculates a second phase deviation Δφr2 that is a deviation between the second target phase φk2* and the second phase φkr2 of the second k-th order harmonic current vector Ivkt2.

The second amplitude feedback controller 34p calculates, based on the second amplitude deviation ΔIr2, a second reference amplitude Amp for the second fluctuating signal Sig2 serving as a manipulated variable for feedback controlling the second amplitude Irkr2 to match with the second target amplitude Irk2*.

The second phase feedback controller 34q calculates, based on the second phase deviation Δφr2, a second reference phase δ for the second fluctuating signals Sig2 serving as a manipulated variable for feedback controlling the second phase φkr2 to match with the second target phase φk2*.

The second signal generator 34r generates the second fluctuating signal Sig2 according to the second reference amplitude Amp2, the second reference phase δ2, and the electrical rotational angle θe measured by the rotational angle sensor 46 for every control period of the control apparatus 30A. For example, the second fluctuating signal Sig2 is a cosine signal having (1) The second reference amplitude Amp2
(2) The sum of the second reference phase 82 and the product between the electrical rotational angle θe and the k (=7) representing the order of the second k-th order harmonic current vector Ivkt2 in accordance with the following equation [eq18]:

$$Sig2 = Amp2 \cdot \cos(7 \cdot \theta e + \delta 2) \qquad [eq18]$$

The harmonic signal generator 34A additionally includes a signal adder 34s operatively connected to both the first and second signal generators 34j and 34r. The signal adder 34s adds the first fluctuating signal Sig1 output from the first signal generator 34j and the second fluctuating signal Sig2 output from the second signal generator 34r, thus generating a fluctuating signal Sigfa. Then, the signal adder 34s outputs the fluctuating signal Sigfa to each of the U-, V-, and W-phase superimposers 32U, 32V, and 32W. This results in each of the U-phase reference angular signal θU with the first phase (θe+φ), the V-phase reference angular signal θV with the second phase (θe+φ−2π/3), and the W-phase reference angular signal θW with the third phase (θe+φ+2π/3) having the fluctuating signal Sigfa superimposed thereon.

That is, the modules 32U to 32W, 34d to 34j, and 34l to 34r serve as, for example, an inducing unit.

This induces, on each phase winding of the motor-generator 10, first harmonic voltages having an angular velocity identical to the angular velocity of the superimposed first fluctuating signal Sig1, and second harmonic voltages having an angular velocity identical to the angular velocity of the superimposed second fluctuating signal Sig2.

The induced first harmonic voltages having the angular velocity identical to the angular velocity of the superimposed first fluctuating signal Sig1 result in first counteracting harmonic current components, which have an angular velocity identical to the angular velocity of the superimposed first fluctuating signal Sig1, flowing in each of the stator windings of the motor-generator 10. In addition, the induced second harmonic voltages having the angular velocity identical to the angular velocity of the superimposed second fluctuating signal Sig2 result in second counteracting harmonic current components, which have an angular velocity identical to the angular velocity of the superimposed second fluctuating signal Sig2, flowing in each of the stator windings of the motor-generator 10.

The first and second counteracting harmonic current components reduce both the target +6-th harmonic current components and target −6-th harmonic current components induced in each of the d- and q-axis currents, thus further reducing torque variations and/or loss, i.e. iron loss, of the motor-generator 10 due to both the target +6-th harmonic current components and the target −6-th harmonic current components.

Each of the first and second embodiments can be modified as follows.

The harmonic signal generator 34 of the first embodiment can calculate the reference amplitude Amp and the reference phase δ for the fluctuating signal Sigf using the following method different from the above method disclosed in the first embodiment.

Specifically, the amplitude feedback controller 34h according to a first modification can be configured to calculate, based on the d-axis k-th order harmonic currents Idk output from the harmonic current converter 34c, a d-axis manipulated variable dm for feedback controlling the d-axis k-th order harmonic currents Idk to match with a first target current.

Additionally, the amplitude feedback controller 34h can be configured to calculate, based on the q-axis k-th order harmonic currents Iqk output from the harmonic current converter 34c, a q-axis manipulated variable qm for feedback controlling the q-axis k-th order harmonic currents Iqk to match with a second target current.

Then, the amplitude feedback controller 34h can be configured to calculate the sum $S(dm^2, qm^2)$ of the square of the value of the d-axis manipulated variable dm and the square of the value of the q-axis manipulated variable qm.

The amplitude feedback controller 34h can be configured to calculate the square root of the sum $S(dm^2, qm^2)$ of the square of the value of the d-axis manipulated variable dm and the square of the value of the q-axis manipulated variable qm as the reference amplitude Amp for the fluctuating signal Sigf in accordance with the following equation [eq19]:

$$Amp = \sqrt{(dm^2 + qm^2)} \qquad [eq19]$$

The phase feedback controller 34i according to the first modification can be configured to calculate arctangent of qm/dm, thus calculating the reference phase δ for the fluctuating signal Sigf in accordance with the following equation [eq20]:

$$\delta = \tan^{-1}\left(\frac{qm}{dm}\right) \qquad [eq20]$$

The harmonic signal generator 34 of the first embodiment can obtain the d- and q-axis k-th order harmonic currents Idk and Iqk using the following method different from the above method disclosed in the first embodiment.

Specifically, the harmonic current converter 34c can be configured to calculate, based on the d- and q-axis command currents Id* and Iq*, a fundamental current component in the three-phase fixed coordinate system. Then, the harmonic current converter 34c can be configured to subtract, from each of the U-, V-, and W-phase currents IU, IV, and IW, the calculated fundamental current component, thus extracting k-th harmonic current components. Then, the harmonic current converter 34c can be configured to directly convert the k-th harmonic current components into d- and q-axis k-th order harmonic currents Idk and Iqk in the k-th order harmonic rotating coordinate system without using the first-order rotating coordinate system.

The target value setter 34e can variably set the target amplitude Irk* and the target phase φk* for the k-th order harmonic current vector Ivkt according to any one of the target torque Trq* and the electrical angular velocity co. The target value setter 34e can set each of the target amplitude Irk* and the target phase φk* for the k-th order harmonic current vector Ivkt to a corresponding one of predetermined fixed values.

The d-axis deviation calculator 34a of the first embodiment calculates the d-axis harmonic components ΔId that is a deviation between the d-axis command current Id* and the d-axis current Idr, but the present disclosure is not limited thereto. Specifically, the d-axis deviation calculator 34a can serve as a bandpass filter or a high-pass filter to filter the d-axis current Idr to thereby extract d-axis harmonic components from the d-axis current Idr as the d-axis current deviation Aid. Similarly, the q-axis deviation calculator 34b can serve as a bandpass filter or a high-pass filter to filter the q-axis current Iqr to thereby extract q-axis harmonic components from the q-axis current Iqr as the q-axis current deviation ΔIq.

The control apparatus 30A according to the second embodiment is configured to reduce first target −5-th order harmonic current components and second target 7-th order harmonic current components, but can be configured to reduce three or more orders of harmonic current components in the same manner as the method disclosed in the second embodiment.

The correction calculator 32 of each of the control apparatuses 30 and 30A can calculate the amplitude correction ΔV serving as a manipulated variable for feedback controlling the d-axis current Idr to match with the d-axis command current Id* in the same manner as a method disclosed in Japanese Patent Application Publication No. 2012-23943.

Each of the first and second embodiments can eliminate the correction calculator 32 from each of the control apparatuses 30 and 30a. In other words, the amplitude control of each of the control apparatuses 30 and 30a does not essentially require the feedback control for the voltage amplitude.

Each of the U-, V-, and W-phase drive signal generators 36U, 36V, and 36W uses the map MAP. The map MAP for each phase has stored therein predetermined high- and low-level pulse patterns of a corresponding-phase drive signal; each of the high- and low-level pulse patterns correlates with a corresponding one of specified values of the modulation factor M for a corresponding one of the U-, V-, and W-phases. The present disclosure is however not limited to the structure. Specifically, the map MAP for each phase can have stored therein predetermined high- and low-level pulse patterns of a corresponding-phase drive signal; each of the high- and low-level pulse patterns correlates with a corresponding one of specified values of the corrected voltage amplitude (Vn+ΔV) for a corresponding one of the U-, V-, and W-phases.

Each of the first and second embodiments uses an IPMSM as an example of rotary machines, but can use another type rotary machine, such as an SPMSM or a wound-field synchronous motor. Rotary machines according to the present disclosure are not limited to synchronous machines. An SPMSM used as the motor-generator 10 according to the first embodiment permits a q-axis current to be used as a controlled variable of the SPMSM because the torque of the SPMSM is defined based on the q-axis current. Induction machines can be used as rotary machines according to the present disclosure. Various types of rotary machines according to the present disclosure can be installed in various types of vehicles, such as an electric automobile. Rotary machines to which the present disclosure is applied are not limited to a component, such as a main engine, of vehicles. Specifically, rotary machines to which the present disclosure is applied can be installed in electric power steering systems and electrical compressors for air conditioning systems.

Each of the control apparatuses 30 and 30A uses estimated torque Te that is a parameter indicative of a controlled variable of the motor-generator 10, but the present disclosure is not limited thereto. Another controlled variable, such as rotational speed of the rotor 10a, of the motor-generator 10 can be used.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for feedback controlling a controlled variable of a rotary machine to thereby rotate a rotor relative to a stator using power obtained by a power converter, the apparatus comprising:
    a phase setter configured to:
    set a phase of an output voltage vector of the power converter in a rotating coordinate system, the phase of the output voltage vector serving as a manipulated variable for feedback controlling the controlled variable of the rotary machine to a target value; and
    output phase information including the phase of the output voltage and an electrical rotational angle of the rotor,
    the rotating coordinate system rotating as the rotor of the rotary machine rotates;
    a storage configured to store therein on-off switching patterns of a switching element of the power converter, the on-off switching patterns being provided for respective predetermined values of an amplitude parameter depending on an amplitude of the output voltage vector;
    a switching unit configured to:
    select one of the on-off switching patterns corresponding to a specified value of the amplitude parameter;
    extract an on or off instruction from the selected one of the on-off switching patterns according to a change of the phase information output from the phase setter; and
    switch on or off the switching element according to the extracted on or off instruction;
    a target harmonic current obtainer configured to obtain, according to a phase current flowing through at least one phase winding of the stator, a target harmonic current component flowing in the rotary machine, the target harmonic current component correlating with a fundamental current component of the phase current; and
    an inducing unit configured to superimpose, on the phase information, a fluctuating signal that changes at an angular velocity identical to an angular velocity of the target harmonic current component, to induce a counteracting harmonic current component in the at least one phase winding, the counteracting harmonic current component counteracting the target harmonic current component.

2. The apparatus according to claim 1, wherein the inducing unit further comprises:
a fluctuating signal generator configured to generate the fluctuating signal according to the target harmonic current component, the phase current and the electrical rotational angle of the rotor; and
a superimposer configured to superimpose the fluctuating signal on the phase information.

3. The apparatus according to claim 2, wherein the target harmonic current obtainer further comprises:
a harmonic-current component calculator configured to convert the target harmonic current component into a target higher-order harmonic current component in a second rotating coordinate system, the second rotating coordinate system rotating at an angular velocity identical to the angular velocity of the target higher-order harmonic current component,
the fluctuating signal generator being configured to generate, based on the target higher-order harmonic current component, the fluctuating signal that serves to induce, as the counteracting harmonic current component, a counteracting order harmonic current component for reducing the target higher-order harmonic current component.

4. The apparatus according to claim 3, wherein the target higher-order harmonic current component comprises a harmonic current component changing at an angular velocity that is (1±6n) times higher than an electrical angular velocity of the rotor where n is an integer other than zero.

5. The apparatus according to claim 4, wherein:
the harmonic-current component calculator further comprises an amplitude and phase calculator configured to:
calculate a d-axis target higher-order harmonic current component and a q-axis target higher-order harmonic current component, the d-axis target higher-order harmonic current component being a current component of the target higher-order harmonic current component in a d-axis of the second rotating coordinate system, and the q-axis target higher-order harmonic current component being a current component of the target higher-order harmonic current component in a q-axis of the second rotating coordinate system, the d-axis and q-axis being electromagnetically perpendicular to each other; and
calculate, based on the d- and q-axis target higher-order harmonic current components, an amplitude and a phase of a target higher-order harmonic current vector of the target higher-order harmonic current component in the second rotating coordinate system, and
the fluctuating signal generator further comprises:
a reference amplitude calculator configured to calculate a reference amplitude as a first manipulated variable for feedback controlling the amplitude of the target higher-order harmonic current vector to match with a target amplitude; and
a reference phase calculator configured to calculate a reference phase as a second manipulated variable for feedback controlling the phase of the target higher-order harmonic current vector to match with a target phase,
the fluctuating signal generator being configured to generate, as the fluctuating signal, a periodic trigonometric-function signal having:
the reference amplitude as an amplitude thereof, and
a sum of the reference phase and a product between a value (1±6n) and the electrical rotational angle of the rotor as an independent variable thereof.

6. The apparatus according to claim 5, wherein the fluctuating signal generator further comprises:
a target-value setter configured to variably set the target amplitude and the target phase of the target higher-order harmonic current vector according to at least one of the target value for the controlled variable of the motor-generator and the electrical angular velocity of the rotor.

7. The apparatus according to claim 5, further comprising:
a two-phase converter configured to convert the phase current into a d-axis current in the d-axis of the first rotating coordinate system and a q-axis current in the q-axis of the first rotating coordinate system;
a command amplitude setter configured to set a command amplitude of the output voltage vector according to a d-axis command current for the d-axis current and a q-axis command current for the q-axis current; and
a manipulated amplitude variable calculator configured to calculate a manipulated amplitude variable for feedback controlling the amplitude of the output voltage vector to match with the command amplitude,
wherein:
the amplitude parameter correlates with the command amplitude of the output voltage vector;
the target harmonic current obtainer is configured to:
obtain a d-axis deviation between the d-axis command current and the d-axis current; and
obtain a q-axis deviation between the q-axis command current and the q-axis current; and
the harmonic-current component calculator is configured to calculate the d- and q-axis target higher-order harmonic current components according to the d- and q-axis deviations.

8. The apparatus according to claim 6, further comprising:
a two-phase converter configured to convert the phase current into a d-axis current in the d-axis of the second rotating coordinate system and a q-axis current in the q-axis of the second rotating coordinate system;
a command amplitude setter configured to set a command amplitude of the output voltage vector according to a d-axis command current for the d-axis current and a q-axis command current for the q-axis current; and
a manipulated amplitude variable calculator configured to calculate a manipulated amplitude variable for feedback controlling the amplitude of the output voltage vector to match with the command amplitude,
wherein:
the amplitude parameter correlates with the command amplitude of the output voltage vector;
the target harmonic current obtainer is configured to:
obtain a d-axis deviation between the d-axis command current and the d-axis current; and
obtain a q-axis deviation between the q-axis command current and the q-axis current; and
the harmonic-current component calculator is configured to calculate the d- and q-axis target higher-order harmonic current components according to the d- and q-axis deviations.

9. The apparatus according to claim 1, wherein the target harmonic current component includes a plurality of harmonic current components that change at an angular velocity that is (1±6n) times higher than an electrical angular velocity of the rotor where n is an integer other than zero.

* * * * *